(12) United States Patent
Zuchoski et al.

(10) Patent No.: US 9,033,430 B2
(45) Date of Patent: May 19, 2015

(54) TRACK ASSEMBLY FOR AN ALL-TERRAIN VEHICLE (ATV) OR OTHER TRACKED VEHICLE

(75) Inventors: Jeremie Zuchoski, Sherbrooke (CA); Jean Bernard, St-Mathieu-du-Parc (CA); Stéphane Pilette, Canton de Hatley (CA)

(73) Assignee: CAMOPLAST SOLIDEAL INC., Sherbrooke, Quebec (CA)

( * ) Notice: Subject to any disclaimer, the term of this patent is extended or adjusted under 35 U.S.C. 154(b) by 75 days.

(21) Appl. No.: 12/767,895

(22) Filed: Apr. 27, 2010

(65) Prior Publication Data

US 2010/0276990 A1 Nov. 4, 2010

Related U.S. Application Data

(60) Provisional application No. 61/173,627, filed on Apr. 29, 2009.

(51) Int. Cl.
| | |
|---|---|
| *B62D 55/14* | (2006.01) |
| *B62D 55/02* | (2006.01) |
| *B62D 55/065* | (2006.01) |
| *B62D 55/075* | (2006.01) |
| *B62D 55/084* | (2006.01) |
| *B62K 5/01* | (2013.01) |
| *B62M 27/02* | (2006.01) |

(52) U.S. Cl.
CPC ............. *B62D 55/02* (2013.01); *B62D 55/065* (2013.01); *B62D 55/075* (2013.01); *B62D 55/084* (2013.01); *B62D 55/14* (2013.01); *B62K 5/01* (2013.01); *B62M 27/02* (2013.01)

(58) Field of Classification Search
CPC ............................. B62D 55/14; B62D 55/104
USPC ......... 305/124, 129, 130, 132, 135, 136, 137, 305/142
See application file for complete search history.

(56) References Cited

U.S. PATENT DOCUMENTS

| | | | | |
|---|---|---|---|---|
| 2,329,901 | A | * | 9/1943 | Herrington ...................... 152/47 |
| 2,592,542 | A | * | 4/1952 | Curtis ........................... 305/178 |
| 3,241,848 | A | | 3/1966 | Flory |

(Continued)

FOREIGN PATENT DOCUMENTS

JP          07276908 A  * 10/1995

OTHER PUBLICATIONS

Camoplast Durabuilt 3500 Series Spec., Track Selector—Step 2—Camoplast Solideal, p. 1 of 1.

(Continued)

*Primary Examiner* — Kip T Kotter
(74) *Attorney, Agent, or Firm* — Amster, Rothstein & Ebenstein LLP

(57) ABSTRACT

A track assembly for providing traction to an all-terrain vehicle (ATV) or other tracked vehicle. The track assembly may comprise a wheel device for contacting an inner side of an endless track such that a longitudinal end segment of the endless track turns around the wheel device. The wheel device allows a change in curvature of the longitudinal end segment of the endless track when the longitudinal end segment of the endless track contacts an obstacle on the ground. In some embodiments, the wheel device may comprise a resilient wheel that is elastically deformable. In other embodiments, the wheel device may comprise a wheel carrier carrying a plurality of carried wheels.

69 Claims, 13 Drawing Sheets

(56) References Cited

U.S. PATENT DOCUMENTS

| | | | |
|---|---|---|---|
| 3,311,424 A * | 3/1967 | Taylor | 305/110 |
| 3,348,518 A | 10/1967 | Forsyth et al. | |
| 3,348,597 A * | 10/1967 | Goldberg et al. | 152/323 |
| 3,580,344 A | 5/1971 | Floyd | |
| 3,601,212 A * | 8/1971 | Peterson et al. | 180/9.44 |
| 4,794,999 A | 1/1989 | Hester | |
| 5,161,866 A * | 11/1992 | Johnson | 305/136 |
| 5,273,296 A | 12/1993 | Lepek | |
| 5,279,378 A * | 1/1994 | Grawey et al. | 180/9.21 |
| 5,462,345 A * | 10/1995 | Purcell | 305/199 |
| 5,607,210 A * | 3/1997 | Brazier | 305/131 |
| 6,068,353 A * | 5/2000 | Juncker et al. | 305/130 |
| 6,074,024 A * | 6/2000 | Juncker | 305/130 |
| 6,540,629 B2 * | 4/2003 | Redmond | 474/135 |
| 6,615,939 B1 | 9/2003 | Karales et al. | |
| 2001/0034281 A1 * | 10/2001 | Redmond | 474/197 |
| 2007/0169968 A1 * | 7/2007 | Todd et al. | 180/9.1 |
| 2008/0164665 A1 | 7/2008 | Chang | |
| 2009/0090570 A1 * | 4/2009 | Zuchoski et al. | 180/9.1 |

OTHER PUBLICATIONS

Polaris RZR 570 EPS Spec. Sheet, 2-pages.
Can-am Renegade Spec. Sheet, 3-pages.
"Go Where Wheels Can't," Camoplast UTV ATV 2013 Spec., 9-pages.

* cited by examiner

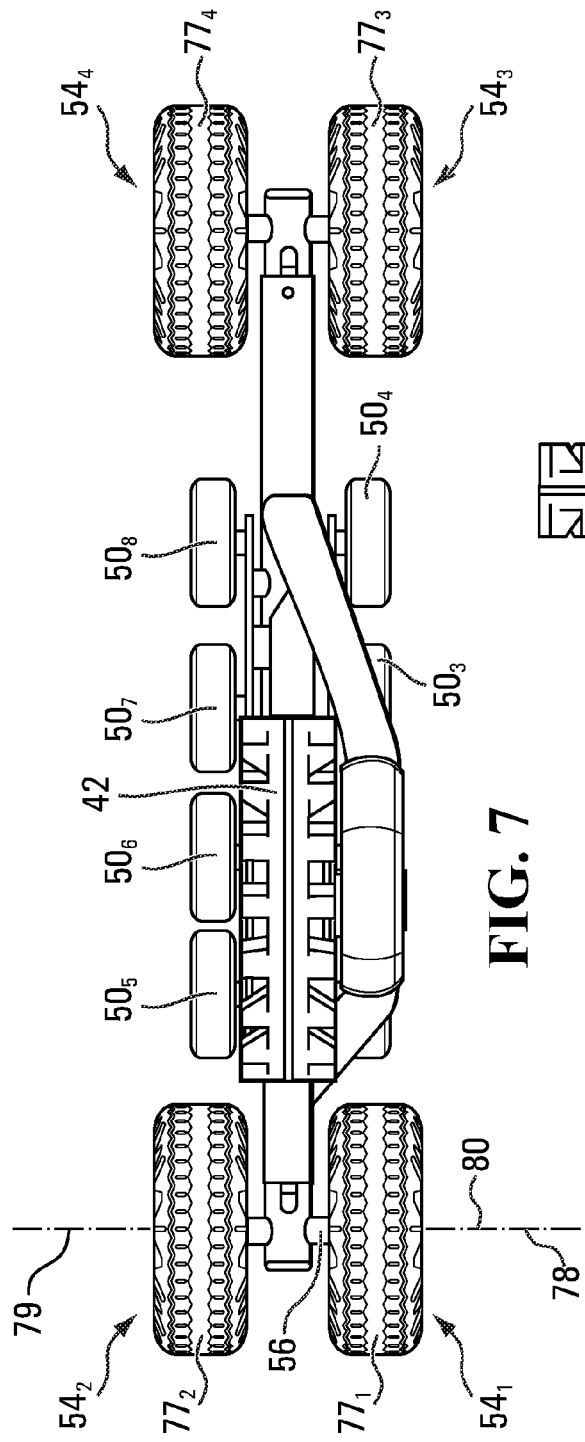
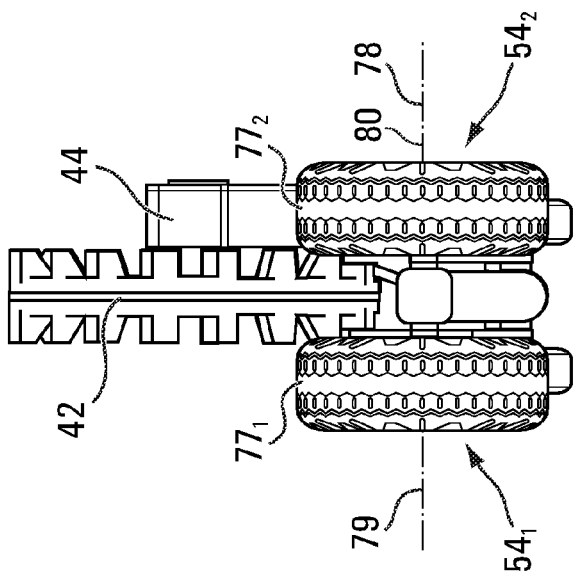
FIG. 7
FIG. 8

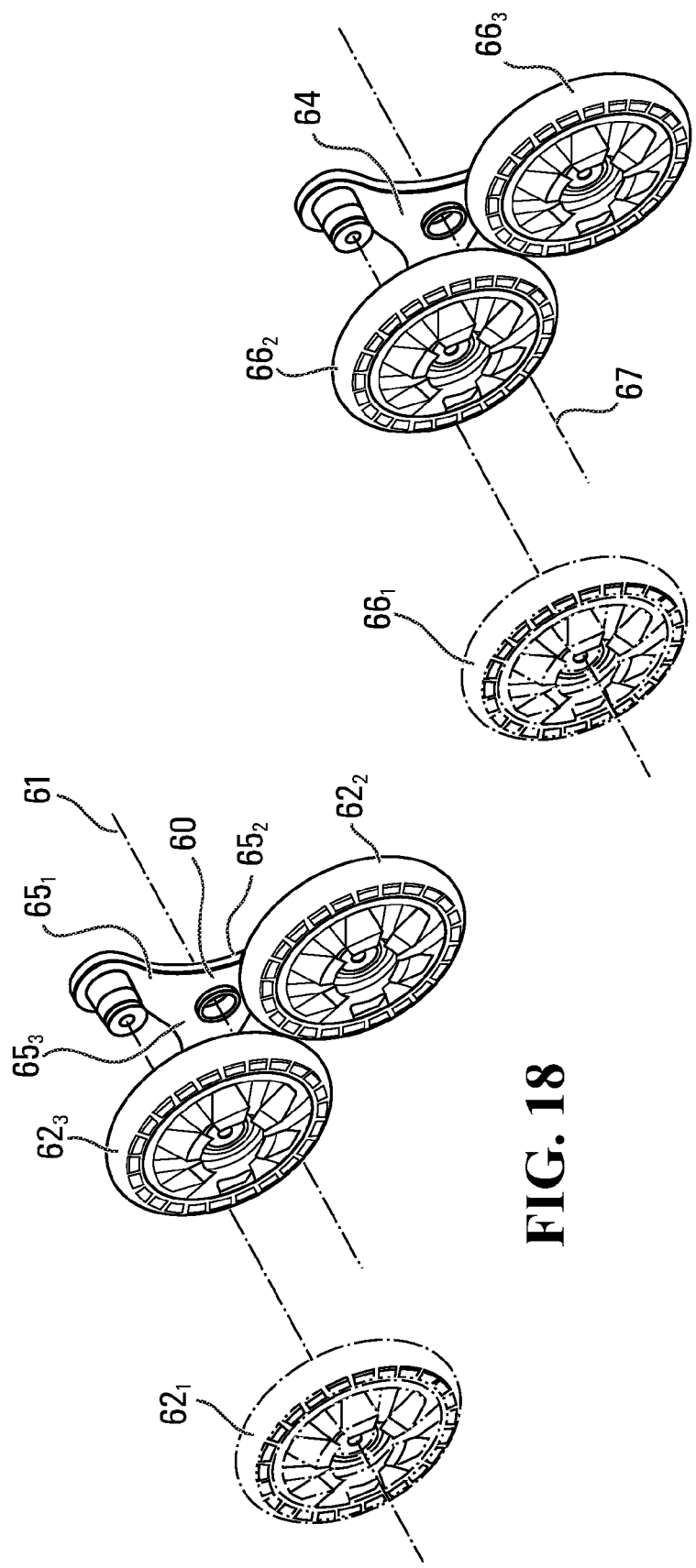

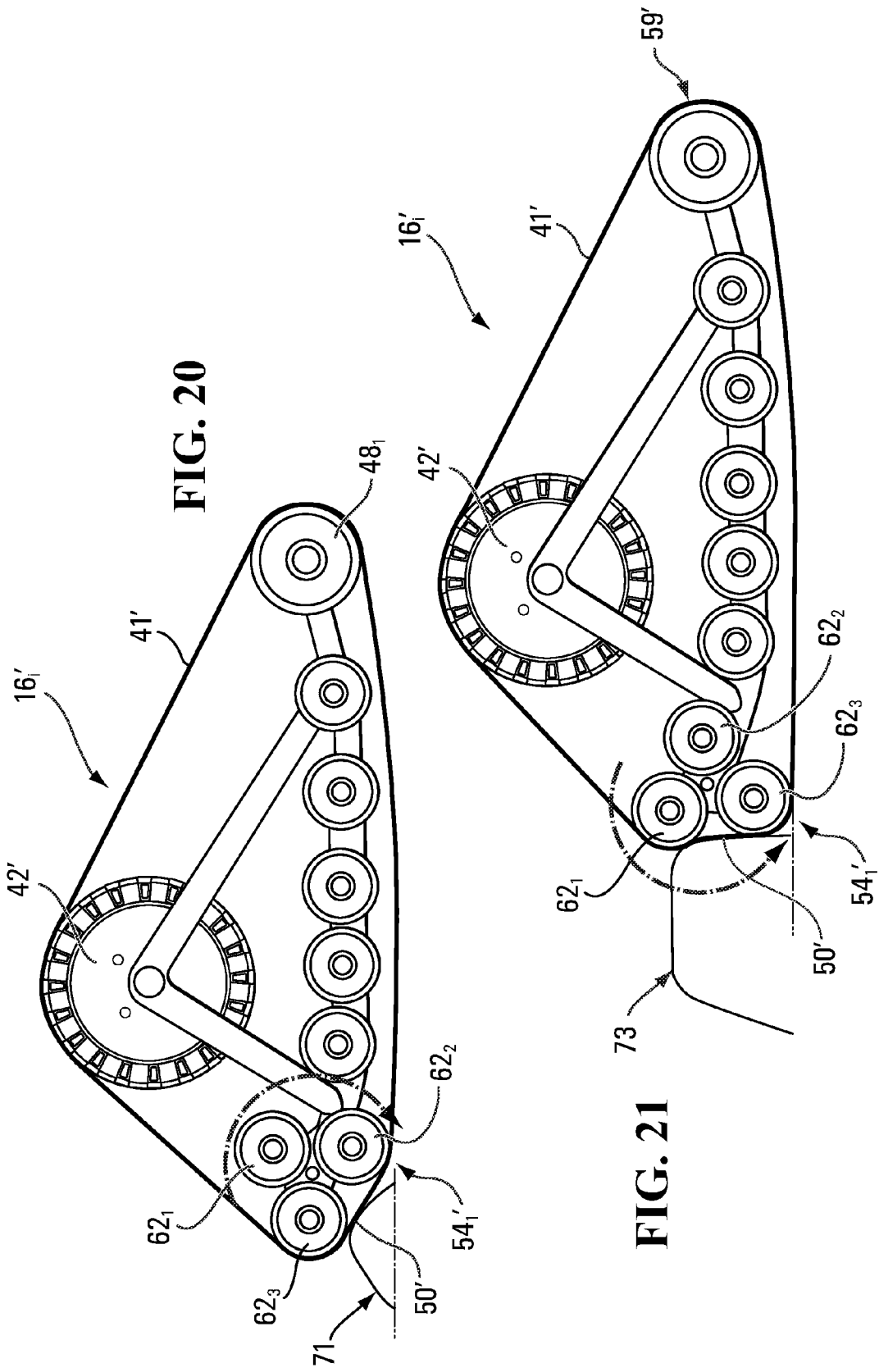

TRACK ASSEMBLY FOR AN ALL-TERRAIN VEHICLE (ATV) OR OTHER TRACKED VEHICLE

CROSS-REFERENCE TO RELATED APPLICATION

This application claims the benefit under 35 U.S.C. 119(e) of U.S. Provisional Patent Application 61/173,627 filed on Apr. 29, 2009 and hereby incorporated by reference herein.

FIELD OF THE INVENTION

The invention relates generally to tracked vehicles and, more particularly, to track assemblies for providing traction to all-terrain vehicles (ATVs) or other tracked vehicles.

BACKGROUND

Tracked vehicles are often used on soft, low friction and/or uneven ground, such as earth, mud, ice and/or snow, because of their endless tracks which enhance their traction and floatation on the ground.

As they travel on the ground, tracked vehicles can encounter various obstacles (e.g., rocks, portions of trees, debris, ice blocks, bumps or other abrupt changes in ground level, etc.) depending on their environment. Such obstacles can create shocks in track assemblies of the tracked vehicles. Depending on their intensity, these shocks may affect ride quality and/or structural integrity of the track assemblies. Also, while most obstacles encountered by tracked vehicles are normally easily surmounted, some obstacles may sometimes prove more difficult to overcome. This can negatively impact a tracked vehicle's performance by slowing it down or in some cases bringing it to a standstill.

For example, all-terrain vehicles (ATVs) propelled by track assemblies may be prone to such problems when encountering obstacles on the ground. For instance, in some situations, an ATV's track assemblies may encounter large rocks, fallen tree portions, or abrupt changes in ground level that induce shocks which can be strongly felt by the ATV's rider. In other situations, an ATV may encounter an obstacle such as a large rock, fallen tree portion or abrupt change in ground level which is difficult to overcome by one of its track assemblies (e.g., due to a tendency of a front region of that track assembly to "dig" or "wedge" itself at the obstacle's base instead of climbing over the obstacle).

Similar problems related to encountering of obstacles on the ground can arise with other types of tracked vehicles.

Accordingly, there is a need for solutions directed to facilitate use of ATVs and other tracked vehicles which are susceptible to encountering obstacles on the ground.

SUMMARY OF THE INVENTION

According to one broad aspect, the invention provides a track assembly for providing traction to an all-terrain vehicle (ATV). The track assembly comprises: a drive wheel for driving an endless track, the endless track having an inner side for facing the drive wheel and a ground-engaging outer side for engaging the ground, the drive wheel being rotatable about an axle of the ATV; a plurality of support wheels for rolling on the inner side of the endless track along a bottom run of the endless track, the support wheels being distributed along a longitudinal direction of the track assembly; and a resilient wheel for contacting the inner side of the endless track such that a longitudinal end segment of the endless track turns around the resilient wheel, the resilient wheel being elastically deformable.

According to another broad aspect, the invention provides a track assembly for providing traction to an all-terrain vehicle (ATV). The track assembly comprises: a drive wheel for driving an endless track, the endless track having an inner side for facing the drive wheel and a ground-engaging outer side for engaging the ground, the drive wheel being rotatable about an axle of the ATV; and a plurality of wheels for contacting the inner side of the endless track along a bottom run of the endless track, at least one of the wheels being a resilient wheel, the resilient wheel being elastically deformable.

According to another broad aspect, the invention provides a track assembly for providing traction to an all-terrain vehicle (ATV). The track assembly comprises:

a drive wheel for driving an endless track, the endless track having an inner side for facing the drive wheel and a ground-engaging outer side for engaging the ground, the drive wheel being rotatable about an axle of the ATV; a plurality of support wheels for rolling on the inner side of the endless track along a bottom run of the endless track, the support wheels being distributed along a longitudinal direction of the track assembly; and a wheel device for contacting the inner side of the endless track such that a longitudinal end segment of the endless track turns around the wheel device, the wheel device allowing a change in curvature of the longitudinal end segment of the endless track when the longitudinal end segment of the endless track contacts an obstacle on the ground.

According to another broad aspect, the invention provides a track assembly for providing traction to an all-terrain vehicle (ATV). The track assembly comprises: a drive wheel for driving an endless track, the endless track having an inner side for facing the drive wheel and a ground-engaging outer side for engaging the ground, the drive wheel being rotatable about an axle of the ATV; a plurality of support wheels for rolling on the inner side of the endless track along a bottom run of the endless track, the support wheels being distributed along a longitudinal direction of the track assembly; and a leading idler wheel located ahead of the support wheels, the leading idler wheel comprising a tire; and a trailing idler wheel located behind the support wheels, the trailing idler wheel comprising a tire.

According to another broad aspect, the invention provides a track assembly for providing traction to a tracked vehicle. The track assembly comprises: a drive wheel for driving an endless track, the endless track having an inner side for facing the drive wheel and a ground-engaging outer side for engaging the ground, the drive wheel being rotatable about an axle of the tracked vehicle; a plurality of support wheels for rolling on the inner side of the endless track along a bottom run of the endless track, the support wheels being distributed along a longitudinal direction of the track assembly; and a wheel device for contacting the inner side of the endless track such that a longitudinal end segment of the endless track turns around the wheel device, the wheel device allowing a change in curvature of the longitudinal end segment of the endless track when the longitudinal end segment of the endless track contacts an obstacle on the ground.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIG. 7 shows a top view of the track assembly of FIG. 5;

FIG. 8 shows an end view of the track assembly of FIG. 5;

FIGS. 18 and 19 show components of a wheel device of the track assembly of FIG. 12;

FIG. 20 shows an example of a reaction of the track assembly of FIG. 12 when encountering an obstacle having a relatively small size; and FIG. 21 shows an example of a reaction of the track assembly of FIG. 12 when encountering an obstacle having a relatively large size.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
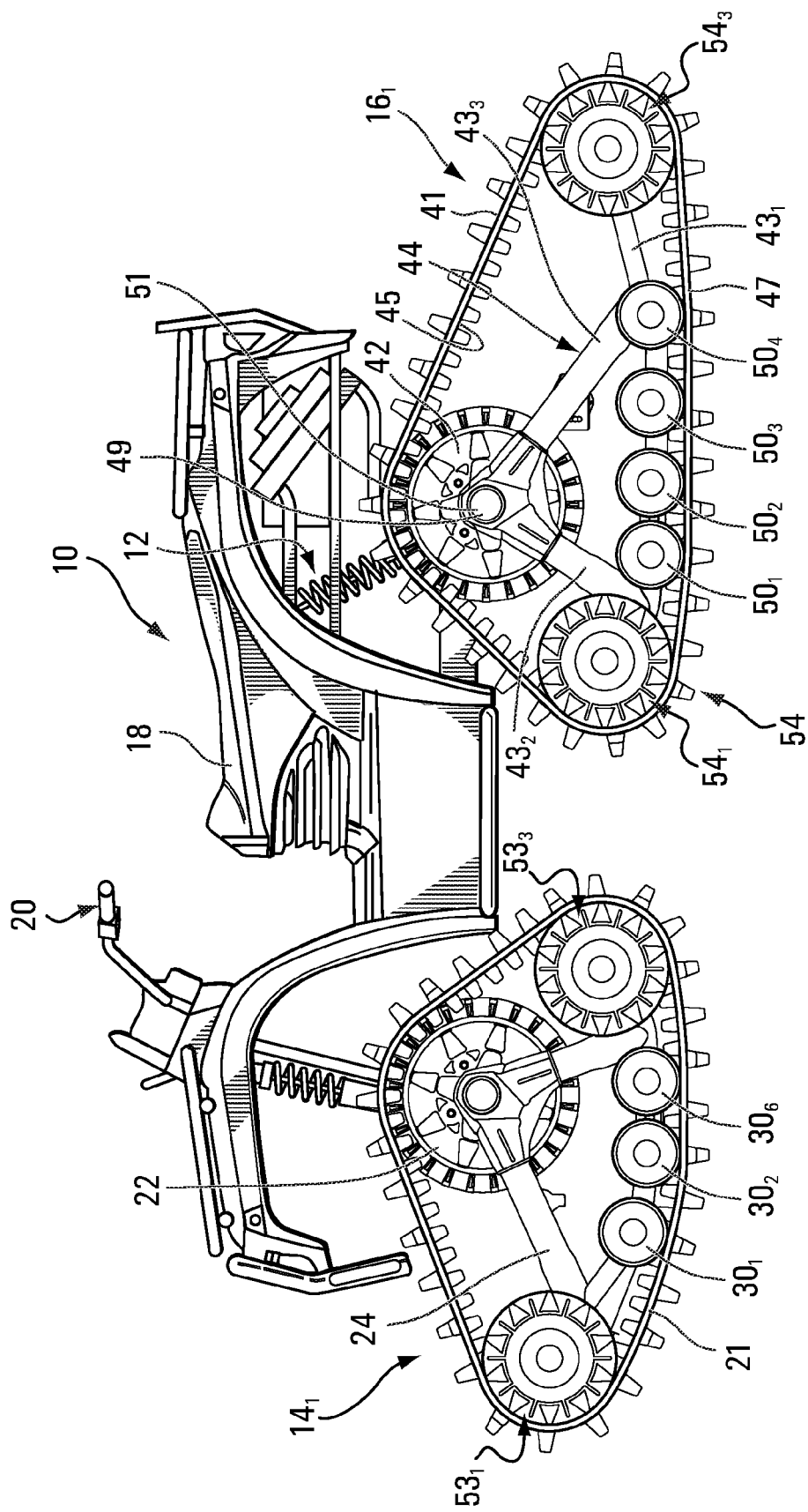
FIG. 1 shows a side view of a tracked vehicle in accordance with an embodiment of the invention.
Figure 2:
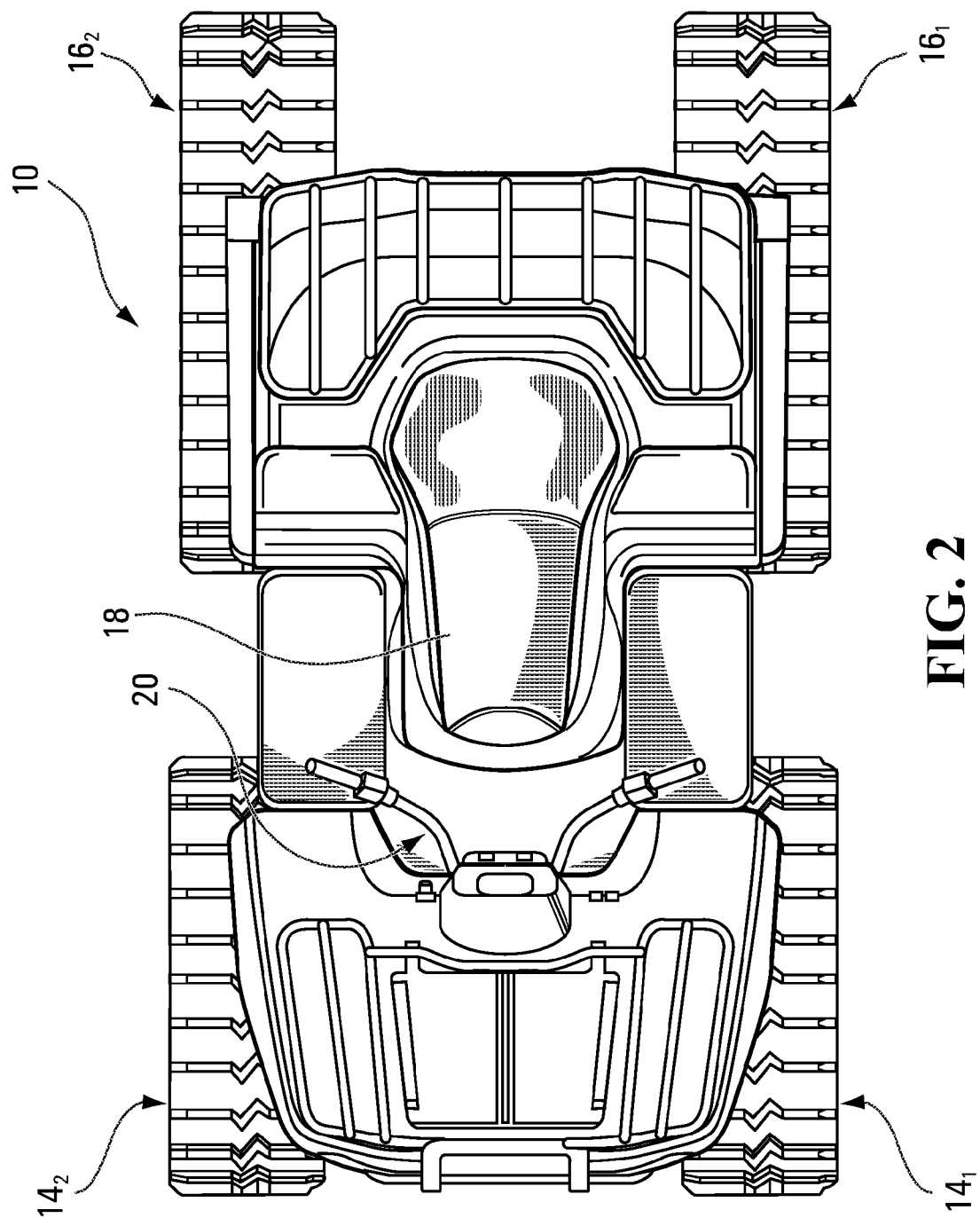
FIG. 2 shows a top view of the tracked vehicle of FIG. 1.

FIGS. 1 and 2 show a tracked vehicle 10 in accordance with an embodiment of the invention. More specifically, in this embodiment, the tracked vehicle 10 is an all-terrain vehicle (ATV), which is a small open vehicle designed to travel off-road on a variety of terrains, including roadless rugged terrain, for recreational, utility and/or other purposes.

In this embodiment, the ATV 10 comprises a prime mover 12, a plurality of track assemblies $14_1$, $14_2$, $16_1$, $16_2$, a steering unit 20, and a seat 18, which enable a driver of the ATV to ride the ATV 10 on the ground.

The prime mover 12 is a source of motive power that comprises one or more motors (e.g., an internal combustion engine, an electric motor, etc.). For example, in this embodiment, the prime mover 12 comprises an internal combustion engine. In other embodiments, the prime mover 12 may comprise another type of motor (e.g., an electric motor) or a combination of different types of motor (e.g., an internal combustion engine and an electric motor) for generating motive power to move the ATV 10.

The prime mover 12 is in a driving relationship with one or more of the track assemblies $14_1$, $14_2$, $16_1$, $16_2$. That is, motive power generated by the prime mover 12 is transmitted to one or more of the track assemblies $14_1$, $14_2$, $16_1$, $16_2$ via a powertrain of the ATV 10.

In this case, the seat 18 is a straddle seat and the ATV 10 is usable by a single person such that the seat 18 accommodates only the driver of the ATV 10. In other cases, the seat 18 may be another type of seat, and/or the ATV 10 may usable by two individuals, namely the driver and a passenger, such that the seat 18 may accommodate both the driver and the passenger (e.g., behind one another or side-by-side) or the ATV 10 may comprise an additional seat for the passenger.

The steering unit 20 enables the driver of the ATV 10 to steer the ATV 10. In this case, the steering unit 20 comprises handlebars. In other cases, the steering unit 20 may comprise a steering wheel or other type of steering device.

The track assemblies $14_1$, $14_2$, $16_1$, $16_2$ provide traction to the ATV 10 on the ground.

The track assemblies $16_1$, $16_2$ are located in a rear part of the ATV 10 to provide traction in this rear part. With additional reference to FIGS. 3 to 8, in this embodiment, each track assembly $16_i$ comprises a frame 44, a drive wheel 42, a plurality of support wheels $50_1$-$50_8$, a plurality of wheel devices $54_1$-$54_4$, and an endless track 41 disposed around these wheels and wheel devices.

The track assembly $16_i$ has a first longitudinal end 57 and a second longitudinal end 59 that define a length of the track assembly $16_i$. A width of the track assembly $16_i$ is defined by a width of the endless track 41. The track assembly $16_i$ has a longitudinal direction, transversal directions including a widthwise direction, and a height direction.

The endless track 41 provides traction to propel the ATV 10 on the ground. The track 41 has an inner side 45 facing the wheels 42, $50_1$-$50_8$ and the wheel devices $54_1$-$54_4$ and defining an inner area of the track 41 in which these wheels and wheel devices are located. The track 41 also has a ground-engaging outer side 47 opposite the inner side 45 and engaging the ground on which the ATV 10 travels. In this embodiment, the inner side 45 of the track 41 comprises a plurality of drive projections (sometimes referred to as "drive lugs") that are spaced apart along the longitudinal direction of the track assembly $16_i$ and that interact with the drive wheel 42 in order to cause the track 41 to be driven. The ground-engaging outer side 27 comprises a plurality of traction projections (sometimes referred to as "traction lugs" or "traction profiles") that are spaced apart along the longitudinal direction of the track assembly $16_i$ and engage the ground to enhance traction.

In this embodiment, the endless track 41 comprises an elastomeric body, i.e., a body comprising elastomeric material, which allows the track 41 to elastically change in shape as it is in motion around the wheels 42, $50_1$-$50_8$ and the wheel devices $54_1$-$54_4$. The elastomeric material can be any polymeric material with the property of elasticity. In this embodiment, the elastomeric material includes rubber. Various rubber compounds may be used and, in some cases, different rubber compounds may be present in different areas of the track 41. In other embodiments, the elastomeric material may include another elastomer in addition to or instead of rubber (e.g., polyurethane elastomer). Also, in this embodiment, the track 41 comprises one or more reinforcements embedded in the elastomeric material (e.g., a layer of reinforcing longitudinal cables and/or a layer of reinforcing fabric).

The track 41 may be constructed in various other manners in other embodiments. For example, in some embodiments, the track 41 may comprise a plurality of parts (e.g., rubber and/or metallic sections) interconnected to one another to form an endless belt, the track 41 may have recesses or holes that interact with the drive wheel 42 in order to cause the track 41 to be driven, and/or the ground-engaging outer side 47 of the track 41 may comprise various patterns of traction projections.

The endless track 41 has a top run, which extends between and above the longitudinal ends 57, 59 of the track assembly $16_i$, and a bottom run, which extends between and below the longitudinal ends 57, 59 of the track assembly $16_i$.

The drive wheel 42 is rotatable about an axle 49 of the ATV 10 for driving the track 41. That is, power generated by the powertrain of the ATV 10 can rotate the axle 49, which rotates the drive wheel 42, which imparts motion of the track 41. In this embodiment, the drive wheel 42 comprises a drive sprocket engaging the drive projections of the inner side 45 of the track 41 in order to drive the track 41. In other embodiments, the drive wheel 42 may be configured in various other ways. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The frame 44 supports various components of the track assembly $16_i$, including the support wheels $50_1$-$50_8$ and the wheel devices $54_1$-$54_4$. More particularly, in this embodiment, the frame 44 comprises three (3) frame elements $43_1$-$43_3$ defining a generally triangular shape. Each of the support wheels $50_1$-$50_8$ and the wheel devices $54_1$-$54_4$ is mounted to the frame element $43_1$. Specifically, the wheel devices $54_1$, $54_2$ are mounted to the frame element $43_1$ in a front longitudinal end region 89 of the track assembly $16_i$, the wheel devices $54_3$, $54_4$ are mounted to the frame element $43_1$ in a rear longitudinal end region 99 of the track assembly $16_i$, and the support wheels $50_1$-$50_8$ are mounted to the frame element $43_1$ in a bottom region of the track assembly $16_i$ between the wheel devices $54_1$-$54_4$. Each of the support wheels $50_1$-$50_8$ may be directly rotatably mounted to the frame element $43_1$ or may be rotatably mounted to a link which is rotatably mounted to the frame element $43_1$ and to which is rotatably mounted an adjacent one of the support wheels $50_1$-$50_8$, thus forming a "tandem". In other embodiments, the frame 44 may be configured in various other manners.

In this embodiment, the frame 44 is pivotable about a pivot point 51 to facilitate motion of the track assembly $16_i$ on uneven terrain and enhance its traction on the ground. More specifically, in this case, the pivot point 51 corresponds to the axle 49 on which the drive wheel 42 is mounted. The frame 44 is pivotally connected at the pivot point 51 by the frame elements $43_2$, $43_3$ that converge towards this point. In this way, the frame 44, and thus the track assembly $16_i$, can pivot about the pivot point 51 to deal with uneven terrain the ATV 10 may traverse. In other embodiments, the frame 44 may not be able to pivot about any pivot point.

The support wheels $50_1$-$50_8$ do not convert power supplied by the prime mover 12 to motive force, but rather support and distribute part of the weight of the ATV 10 on the ground as well as guide the track 41 as it is driven by the drive wheel 42. The support wheels $50_1$-$50_8$ roll on the inner side 45 of the track 41 along the bottom run of the track 41 to apply the bottom run on the ground.

Each of the wheel devices $54_1$-$54_4$ is a device comprising at least one wheel. In this embodiment, the wheel device $54_1$ comprises a wheel $77_1$, the wheel device $54_2$ comprises a wheel $77_2$, the wheel device $54_3$ comprises a wheel $77_3$, and the wheel device $54_4$ comprises a wheel $77_4$. The wheels $77_1$, $77_2$ are leading idler wheels, and the wheels $77_3$, $77_4$ are trailing idler wheels. The wheel devices $54_1$, $54_2$ are spaced apart along the widthwise direction of the track assembly $16_i$, and so are the wheel devices $54_3$, $54_4$.

The wheel devices $54_1$, $54_2$ are rotatable about respective axes of rotation 78, 79. In this embodiment, the axes of rotation 78, 79 are aligned with one another to constitute a common axis of rotation 80. More specifically, in this example, the wheel devices $54_1$, $54_2$ are rotatably mounted to the frame 44 via an axle 56 which provides the axis of rotation 80. In other examples, the wheel devices $54_1$, $54_2$ may be mounted to the frame 44 via respective axles which are aligned with one another and which provide the axes of rotation 78, 79. In other embodiments, the axis of rotation 78 and the axis of rotation 79 may be offset from one another.

Each of the wheel devices $54_1$, $54_2$ contacts the inner side 45 of the endless track 41 such that a longitudinal end segment 50 of the endless track 41 turns around that wheel device. That is, each of the wheel devices $54_1$, $54_2$ contacts both the top run of the endless track 41 and the bottom run of the endless track 41 such that the longitudinal end segment 50 of the endless track 41 includes a longitudinal end part of the top run of the endless track 41 and a longitudinal end part of the bottom run of the endless track 41. In this embodiment, the longitudinal end segment 50 of the endless track 41 is located between the axis of rotation 80 of the wheeled devices $54_1$, $54_2$ and the longitudinal end 57 of the track assembly $16_i$. In embodiments in which the axis of rotation 78 and the axis of rotation 79 are offset from one another, the longitudinal end segment 50 of the endless track 41 is located between the longitudinal end 57 of the track assembly $16_i$ and a given one of the axes of rotation 78, 79 which is closest to the longitudinal end 57 of the track assembly $16_i$. Thus, in this example, the longitudinal end segment 50 of the endless track 41 is that segment of the track 41 between points $A_1$ and $B_1$.

The wheel devices $54_1$, $54_2$ are leading wheel devices that maintain the track 41 in tension, and can help to support and distribute part of the weight of the ATV 10 on the ground.

In addition, the wheel devices $54_1$-$54_4$ facilitate use of the ATV 10 when the ATV 10 encounters obstacles (e.g., rocks, portions of trees, debris, bumps, abrupt changes in ground level, etc.) on the ground. For instance, each of the wheel devices $54_1$-$54_4$ may absorb shocks when the track assembly $16_i$ encounters obstacles on the ground and/or may make it easier for the track assembly $16_i$ to surmount obstacles on the ground.

Each of the wheel devices $54_1$, $54_2$ allows a change in curvature of the longitudinal end segment 50 of the endless track 41 when the longitudinal end segment 50 of the endless track 41 contacts an obstacle on the ground. This may absorb a shock resulting from contact with the obstacle and/or may make it easier for the track assembly $16_i$ to surmount the obstacle.

More particularly, in this embodiment, the wheels $77_1$, $77_2$ are resilient wheels which are elastically deformable. That is, each of the resilient wheels $77_1$, $77_2$ can deform under load and regain its original shape upon removal of the load. When the longitudinal end segment 50 of the endless track 21 contacts an obstacle on the ground as the ATV 10 moves, one or both of the resilient wheels $77_1$, $77_2$ can elastically deform to allow a change in curvature of the longitudinal end segment 50 of the endless track 21. One or both of the resilient wheels $77_1$, $77_2$ can be compressed under load of the ATV 10 to allow the longitudinal end segment 50 of the endless track 21 to change in curvature in order to generally conform to a contacted part of the obstacle. This elastic deformation of one or both of the resilient wheels $77_1$, $77_2$ absorbs at least part of a shock resulting from contact with the obstacle. Also, the change in curvature of the longitudinal end segment 50 of the endless track 21 may enhance its traction on the obstacle and can thus facilitate climbing of the track assembly $16_i$ over the obstacle. As the obstacle is surmounted and stress on one or both of the resilient wheels $77_1$, $77_2$ that had been compressed is reduced, any of the resilient wheels $77_1$, $77_2$ that had been compressed can regain its original shape.

Each of the resilient wheels $77_1$, $77_2$ may be elastically deformable to different radial extents in various embodiments. For example, in some embodiments, a radial extent E corresponding to at least 5%, in some cases at least 10%, in some cases at least 15%, in some cases at least 20%, in some cases at least 25%, in some cases at least 30%, in some cases at least 35%, in some cases at least 40% of an outer radius R of each of the resilient wheels $77_1$, $77_2$ may be elastically deformable. In this case, the radial extent E of each of the resilient wheels $77_1$, $77_2$ that is elastically deformable corresponds to about 50% of the outer radius R of that wheel. In some embodiments, an entirety of the resilient wheel may be elastically deformable.

The resilient wheels $77_1$, $77_2$ may be compressible radially by different degrees in various embodiments. For example, in some embodiments, each of the resilient wheels $77_1$, $77_2$ may be compressible radially in use (i.e., under loads expected to be experienced when the track assembly $16_i$ encounters obstacles on the ground) by at least 5%, in some cases by at least 10%, in some cases by at least 15%, in some cases by at least 20%, in some cases by at least 25%, in some cases by at least 30%, in some cases by at least 35%, and in some cases by at least 40% of its outer radius R. For instance, in an embodiment where each of the resilient wheels $77_1$, $77_2$ has an outer radius of 130 mm, each of these resilient wheels may be capable of compressing itself radially by at least 65 mm (i.e., 50%). The actual degree of compression of a given one of the resilient wheels $77_1$, $77_2$ when the track assembly $16_i$ encounters an obstacle will depend on the nature of the obstacle (e.g., its shape, material, etc.) and the load exerted on that wheel by the ATV 10.

In this embodiment, each of the resilient wheels $77_1$, $77_2$ comprises a hub 75 and a deformable wheel portion 58 around the hub 75. The hub 75 is rigid and rotatable about the axle 56. For example, the hub 75 may comprise one or more parts made of rigid metal, plastic, and/or composite material.

The deformable wheel portion 58 may constitute a tire. For instance, in this case, the deformable wheel portion 58 constitutes a non-pneumatic tire (i.e., an airless tire). More particularly, in this case, the deformable wheel portion 58 is made of foam such that the resilient wheel $77_i$ is a foam wheel (i.e., a wheel at least partly made of foam). The foam is elastically deformable such that it can deform under load and regain its original shape when the load is removed. Various types of foam may be used. For example, in some embodiments, the foam may be polymeric foam (e.g., closed-cell polymeric foam). For instance, in some cases, the foam may be polyurethane foam.

As shown in FIGS. 4 to 9, in this embodiment, an outer diameter of each of the resilient wheels $77_1$, $77_2$ is greater than an outer diameter of each of the support wheels $50_1$-$50_8$. Each of the resilient wheels $77_1$, $77_2$ is wider than each of the support wheels $50_1$-$50_8$ in the widthwise direction of the track assembly $16_i$.

Figure 3:
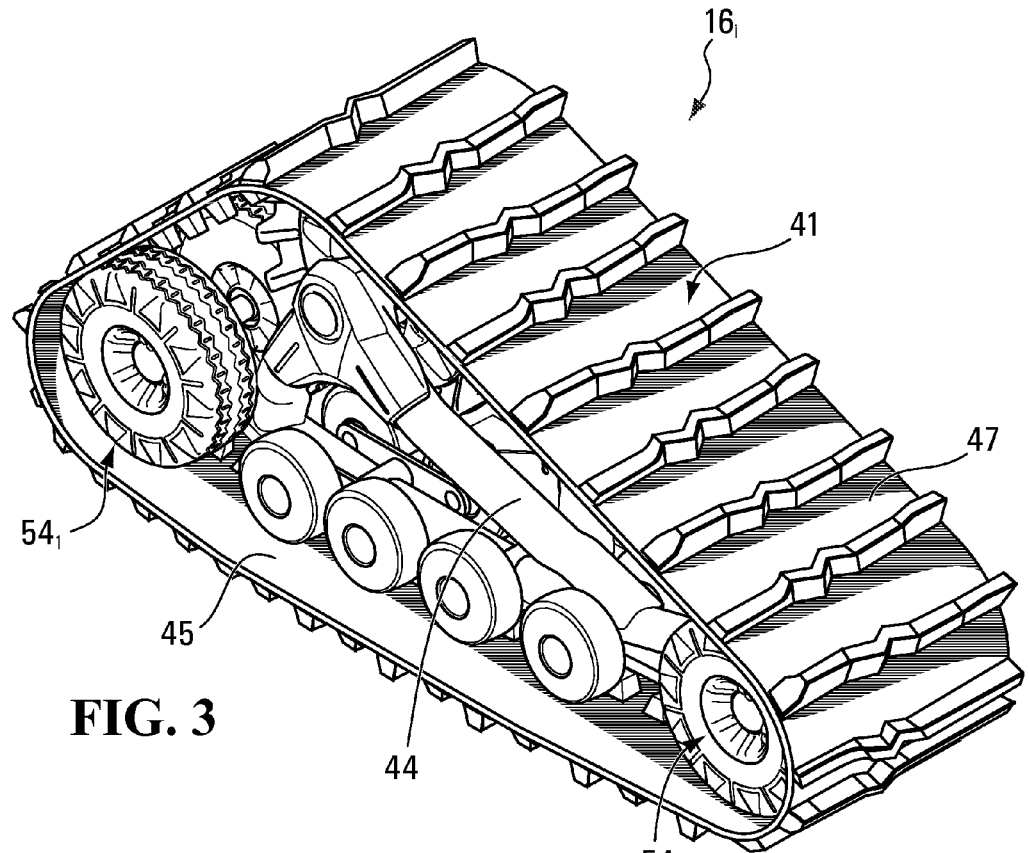
FIG. 3 shows a perspective view of a track assembly of the tracked vehicle of FIG. 1.

As shown in FIGS. 7 and 8, in this embodiment, the resilient wheels $77_1$, $77_2$ collectively occupy a majority of a span of the resilient wheels $77_1$, $77_2$ in the widthwise direction of the track assembly $16_i$. As shown in FIG. 3, in this embodiment, the width of a resilient wheel $77_i$ in the widthwise direction of the track assembly $16_i$ is greater than a dimension of a drive projection of the inner side 45 of the track 41 in the widthwise direction of the track assembly $16_i$.

The resilient wheels $77_1$, $77_2$ may be implemented in various other ways in other embodiments. For example, in some embodiments, each of the resilient wheels $77_1$, $77_2$ may comprise elastic material other than foam (e.g., rubber or other elastomeric material), which is capable of deforming itself under load and then regaining its original shape upon removal of the load. As another example, in some embodiments, each of the resilient wheels $77_1$, $77_2$ may comprise a pneumatic tire.

The wheel devices $54_3$, $54_4$ are configured in a manner similar to the wheel devices $54_1$, $54_2$. Each of the wheel devices $54_3$, $54_4$ contacts the inner side 45 of the endless track 41 such that a longitudinal end segment 32 of the endless track 41 turns around that wheeled device. The longitudinal end segment 32 of the endless track 41 is located between an axis of rotation of the wheel devices $54_3$, $54_4$ and the longitudinal end 59 of the track assembly $16_i$. Thus, in this example, the longitudinal end segment 32 of the endless track 41 is that segment of the track 41 between points $A_2$ and $B_2$.

Each of the wheel devices $54_3$, $54_4$ allows a change in curvature of the longitudinal end segment 32 of the endless track 41 when the longitudinal end segment 32 of the endless track 41 contacts an obstacle on the ground. This may absorb a shock resulting from contact with the obstacle and/or may make it easier for the track assembly $16_i$ to surmount the obstacle. More particularly, in this embodiment, the wheels $77_3$, $77_4$ are resilient wheels which are elastically deformable, as discussed above in respect of the wheels $77_1$, $77_2$.

As shown in FIGS. 4 to 7, in this embodiment, a distance between the axis of rotation of the drive wheel 42 and the axis of rotation of the leading idler wheels $77_1$, $77_2$ in the longitudinal direction of the track assembly $16_i$ is different from a distance between the axis of rotation of the drive wheel 42 and the axis of rotation of the trailing idler wheels $77_3$, $77_4$ in the longitudinal direction of the track assembly $16_i$.

The track assemblies $14_1$, $14_2$ are located in a front part of the ATV 10 to provide traction in this front part. Each track assembly $14_i$ comprises a track 21, a drive wheel 22, a frame 24, a plurality of support wheels $30_1$-$30_6$, and a plurality of wheel devices $53_1$-$53_4$. These components of the track assembly $14_i$ are respectively similar in construction and function to the track 41, the drive wheel 42, the frame 44, the support wheels $50_1$-$50_8$, and the wheel devices $54_1$-$54_4$ and will therefore not be further discussed.

Figure 9:
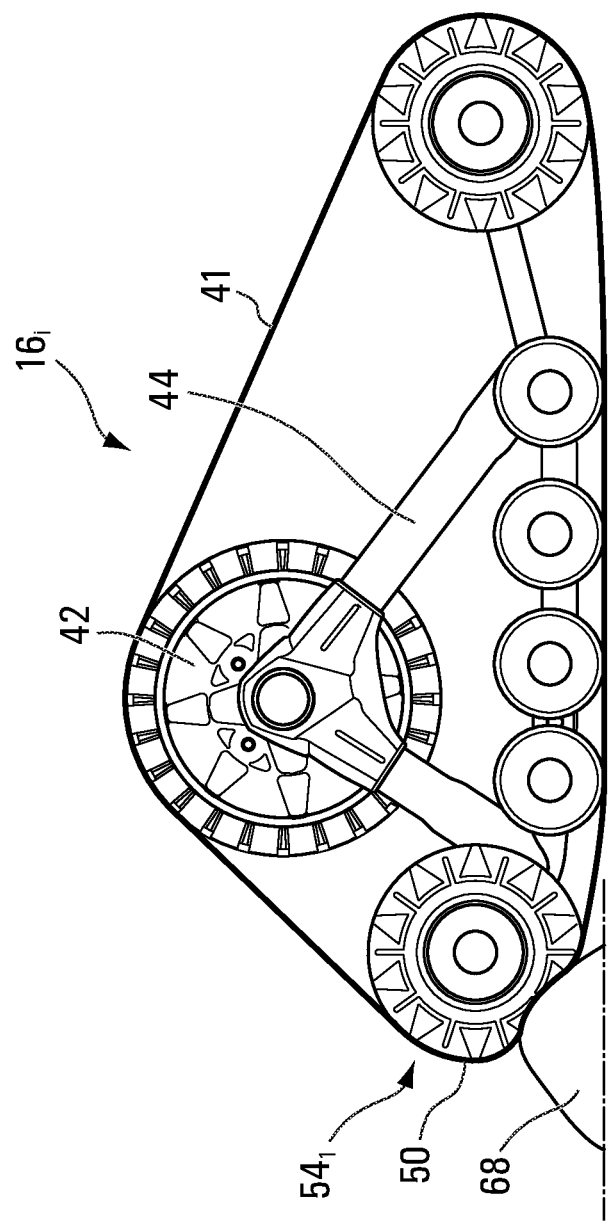
FIG. 9 shows an example of a reaction of the track assembly of FIG. 3 when encountering an obstacle on the ground.

With reference now to FIG. 9, there will be described an example illustrating how the wheel devices $53_1$-$53_4$, $54_1$-$54_4$ of the track assemblies $14_1$, $14_2$, $16_1$, $16_2$ may absorb shocks resulting from contact with obstacles on the ground and/or may make it easier for the track assemblies $14_1$, $14_2$, $16_1$, $16_2$ to surmount such obstacles.

Although obstacles (e.g., rocks, portions of trees, debris, bumps, abrupt changes in ground level, etc.) come in a variety of different shapes and sizes, they may all conceptually be viewed, from the perspective of the ATV 10, as representing a variation in ground level, namely a variation between a first ground level just prior to the obstacle and a second ground level corresponding to a top part of the obstacle. For example, a large, irregularly shaped rock can be viewed as representing a variation between a first ground level at a base of the rock and a second ground level corresponding to the highest point of the rock.

Every obstacle can also be viewed as having a steepness that can influence a degree to which it can be easily or not easily overcome. For example, when viewing an obstacle as a variation between two ground levels, the steepness of the obstacle can be viewed as corresponding to the slope of a line following or tangent to the general profile of the obstacle between these two ground levels. This slope, which will hereinafter be referred to as the "general slope" of the obstacle, may affect how the wheel devices $54_1$-$54_4$, $53_1$-$53_4$ of the track assemblies $14_1$, $14_2$, $16_1$, $16_2$ react to the obstacle in question.

FIG. 9 shows an example of the result of an encounter between the longitudinal end segment 50 of the endless track 41 of the track assembly $16_i$ and an obstacle 68 on the ground. In this example, it is assumed that the obstacle 68 lying in the path of the ATV 10 is a rock. It is further assumed that the ATV 10 was in motion along level ground and that the track assemblies $14_1$, $14_2$ in the front part of the ATV 10 have already cleared the rock 68 which is now lying directly ahead of the track assemblies $16_1$, $16_2$ in the rear part of the ATV 10.

Figure 4:
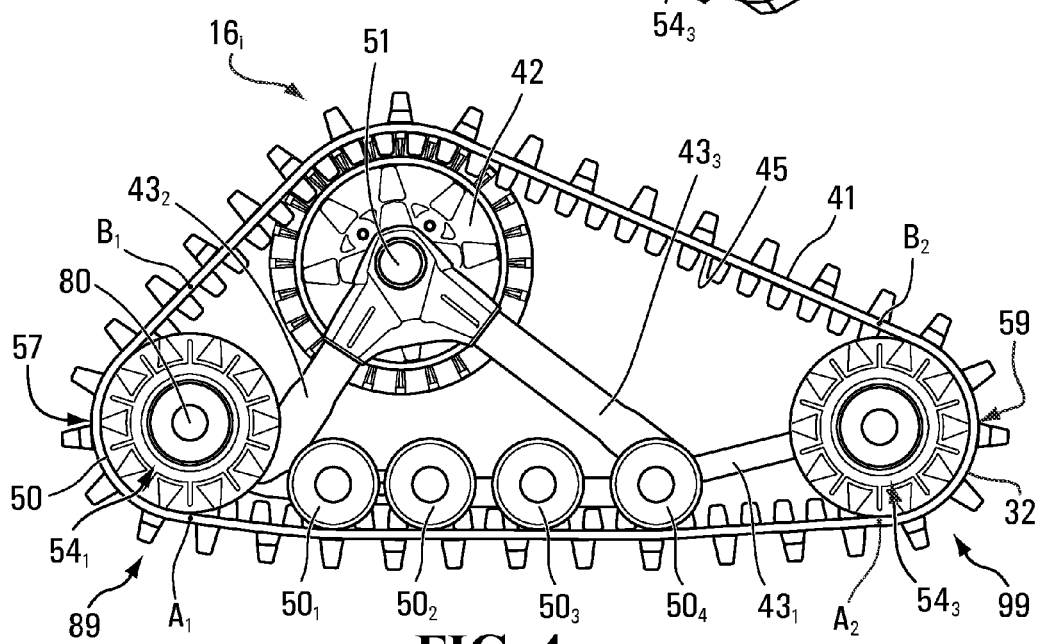
FIG. 4 shows a side view of the track assembly of FIG. 3.
Figure 5:
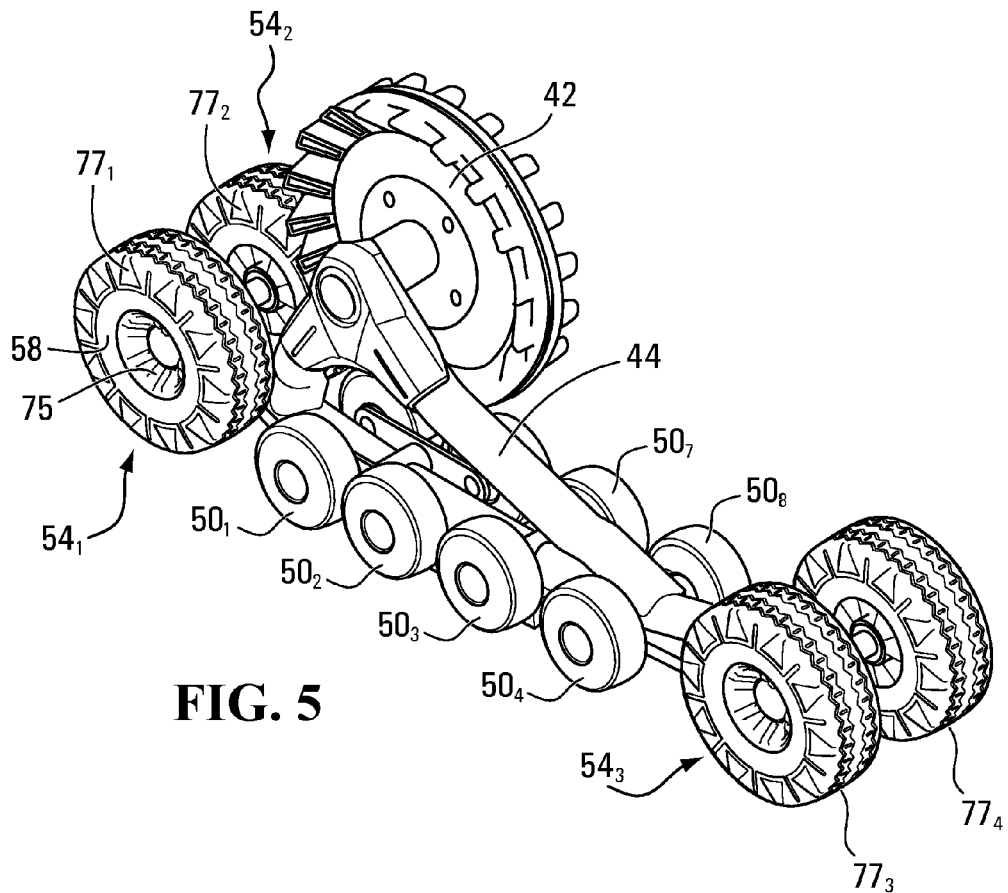
FIG. 5 shows a perspective view of the track assembly of FIG. 3 with a track removed.
Figure 6:
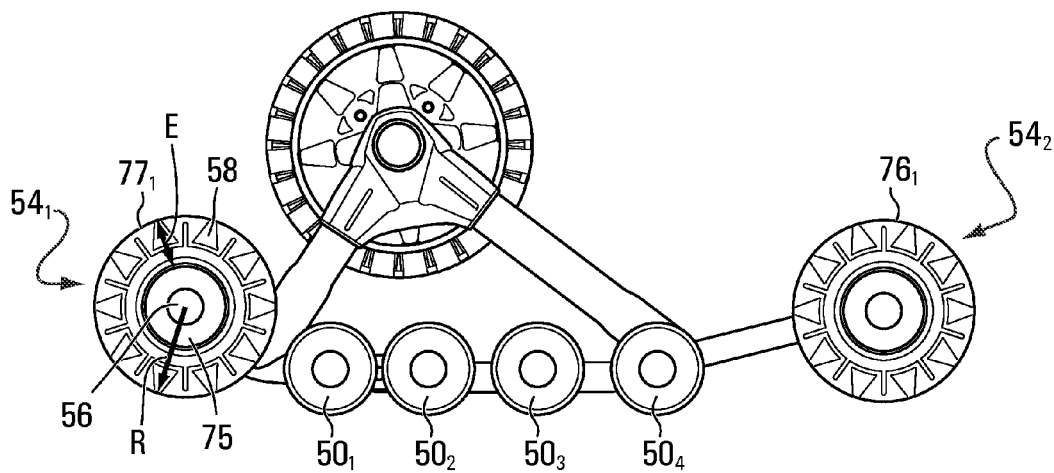
FIG. 6 shows a side view of the track assembly of FIG. 5.

Up until the track assembly $16_i$ contacts the rock 68, the wheel devices $54_1$, $54_2$ is in a state as illustrated in FIGS. 1 and 4, namely as it is when the ATV 10 is travelling along a level ground surface. In particular, the resilient wheels $77_1$, $77_2$ have a generally non-deformed circular shape. The track 41 thus has a curvature as shown in FIGS. 1 and 4, where the longitudinal end segment 50 of the track 41 has a convexity which generally corresponds to that of a circular arc defined by the generally non-deformed circular shape of the resilient wheels $77_1$, $77_2$.

When the longitudinal end segment 50 of the endless track 41 of the track assembly $16_i$ contacts the rock 68, one or both of the wheel devices $54_1$, $54_2$ react to this contact. More particularly, in this example, under load of the ATV 10, the resilient wheels $77_1$, $77_2$ are compressed to allow the longitudinal end segment 50 of the track 41 to change in curvature in order to generally conform to a part of the rock 68 that is engaged by the track 41. Specifically, the compression of the resilient wheels $77_1$, $77_2$ induces a change in curvature of the longitudinal end segment 50 of the track 41. This change in curvature of the longitudinal end segment 50 of the track 41 allows it to generally conform to the general slope of the rock 68. In this case, the change in curvature is such that the portion of the track 41 contacting the compressed section of the resilient wheels $77_1$, $77_2$ is oriented generally upwardly and forwardly at an angle corresponding generally to the general slope of the rock 68. At that point, the longitudinal end segment 50 of the track 41 is more convex than it was prior to the track assembly $16_i$ contacting the rock 68. This elastic deformation of one or both of the resilient wheels $77_1$, $77_2$ absorbs at least part of a shock resulting from contact with the rock 68. Also, the change in shape of the track 41 thus enhances its traction on the rock 68 and thus facilitates climbing of the track assembly $16_i$ over the rock 68.

As the track assembly $16_i$ reaches the top part of the rock 68 and then moves down the rock 68, stress on the resilient wheels $77_1$, $77_2$ is reduced causing each of the resilient wheels $77_1$, $77_2$ to regain its original shape. In turn, this causes the longitudinal end segment 50 of the track 41 to regain its original curvature. Upon having cleared the rock 68, the track assembly $16_i$ continues to operate in the state as shown in FIGS. 1 and 4.

It will thus be appreciated that the wheel devices $53_1$-$53_4$, $54_1$-$54_4$ of the track assemblies $14_1$, $14_2$, $16_1$, $16_2$ allows the ATV 10 to absorb shocks resulting from contact with obstacles on the ground and/or allows the ATV 10 to more easily overcome such obstacles. In particular, by allowing a change in curvature of a longitudinal end segment of its endless track, each of the track assemblies $14_1$, $14_2$, $16_1$, $16_2$ allows that segment of the track \ to generally conform to an encountered obstacle. In other words, each of the track assemblies $14_1$, $14_2$, $16_1$, $16_2$ provides a way to change the shape of a longitudinal end segment of its endless track based on the size and shape of the obstacle encountered. This local elastic deformation of the track may absorb the shock resulting from contact with the obstacle. This local elastic deformation may also allow more of its ground-engaging side 47 to come into contact with the obstacle, thus providing an increased surface area that can allow the track assembly $14_i$, $16_i$ to more easily climb over the obstacle. This is useful for obstacles of various shapes and sizes, but especially for those obstacles that would otherwise present problems for a traditional idler wheel. For example, once the track assemblies $14_1$, $14_2$ have cleared an obstacle such that the obstacle is now located between the track assemblies $14_1$, $14_2$ and the track assemblies $16_1$, $16_2$, the obstacle surmounting device $54_1$ of each of the track assemblies $16_1$, $16_2$ can make it easier for the track assemblies $16_1$, $16_2$ to overcome the obstacle than it would otherwise if the track assemblies $16_1$, $16_2$ had, instead of their respective obstacle surmounting device $54_1$, one or more traditional idler wheels that could have certain difficulty in overcoming the obstacle, for instance, due to a tendency of a front region of that track assembly to "dig" or "wedge" itself at the obstacle's base instead of climbing over the obstacle.

While in this embodiment the track assemblies $14_1$, $14_2$, $16_1$, $16_2$ are configured in a particular way, they may be configured in various other ways in other embodiments.

For example, in some embodiments, the track assembly $14_i$, $16_i$ may comprise more or less than two resilient wheels (such as the resilient wheels $77_1$-$77_4$) adjacent to each of its longitudinal ends. For instance, in some embodiments, the track assembly $14_i$, $16_i$, may comprise a single resilient wheel or three or more resilient wheels adjacent to each of its longitudinal ends.

As another example, in some embodiments, one or more of the support wheel $50_1$-$50_8$ may be resilient wheels that are elastically deformable as discussed above in connection with the resilient wheels $77_1$-$77_4$. For instance, in some cases, one or more of the support wheel $50_1$-$50_8$ may be resilient wheels similar in construction to, but smaller than, the resilient wheels $77_1$-$77_4$.

As yet another example, instead of having wheel devices $53_i$, $54_i$ positioned in respective front and rear longitudinal end regions 89, 99 of the track assembly $14_i$, $16_i$, in some embodiments, the track assembly $14_i$, $16_i$ may comprise wheel devices $53_i$, $54_i$ only in one of its front and rear longitudinal end regions. In such embodiments, one or more conventional rigid idler wheels may be provided in the longitudinal end region of the track assembly $14_i$, $16_i$ where there is no wheel device $53_i$, $54_i$.

Although in this embodiment each of the track assemblies $14_1$, $14_2$, $16_1$, $16_2$ comprises wheel devices $53_i$, $54_i$, in other embodiments, some of the track assemblies $14_1$, $14_2$, $16_1$, $16_2$ may not comprise any such wheel device $53_i$, $54_i$.

Figure 10:
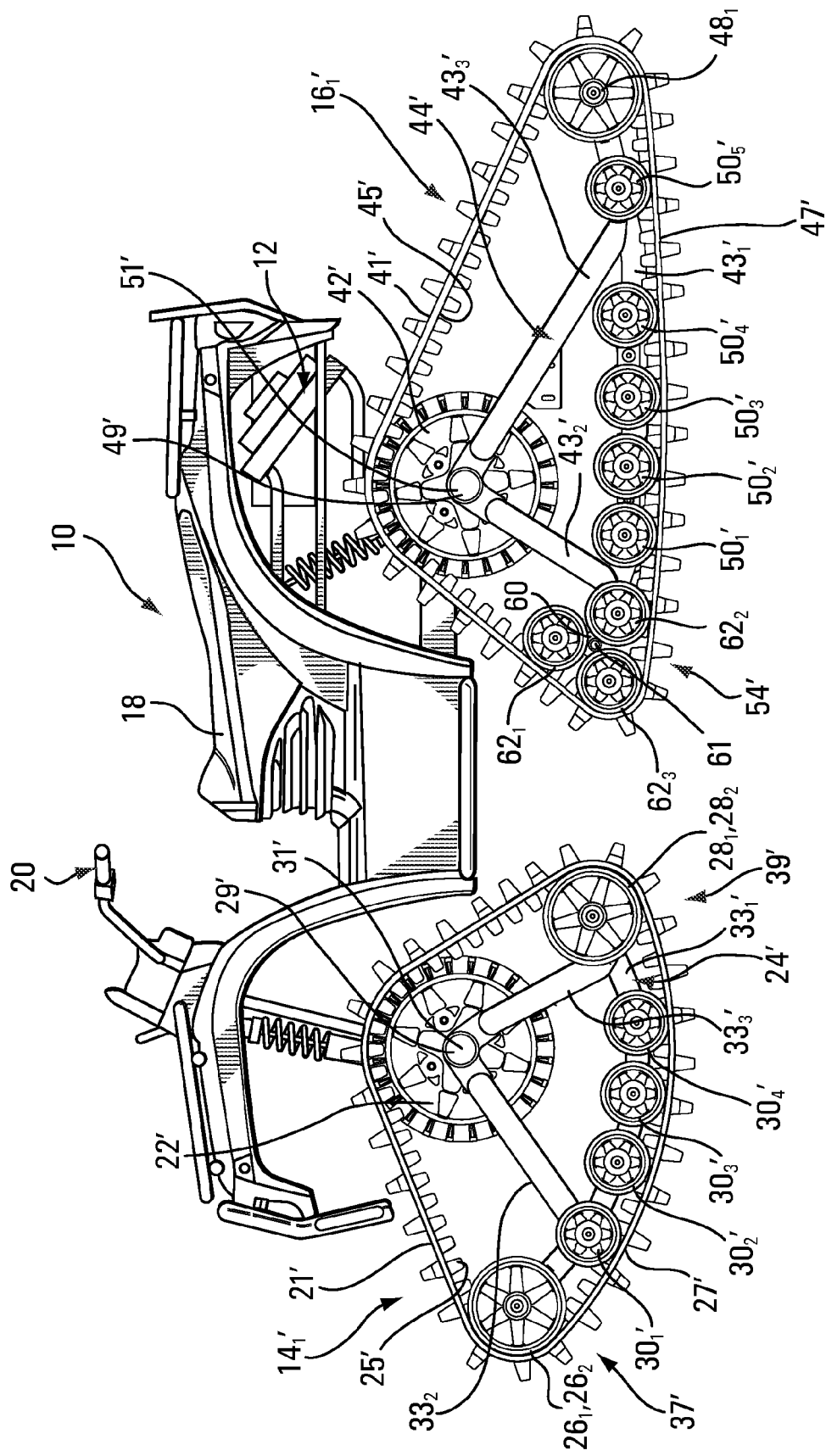
FIG. 10 shows a side view of the tracked vehicle in accordance with another embodiment of the invention.
Figure 11:
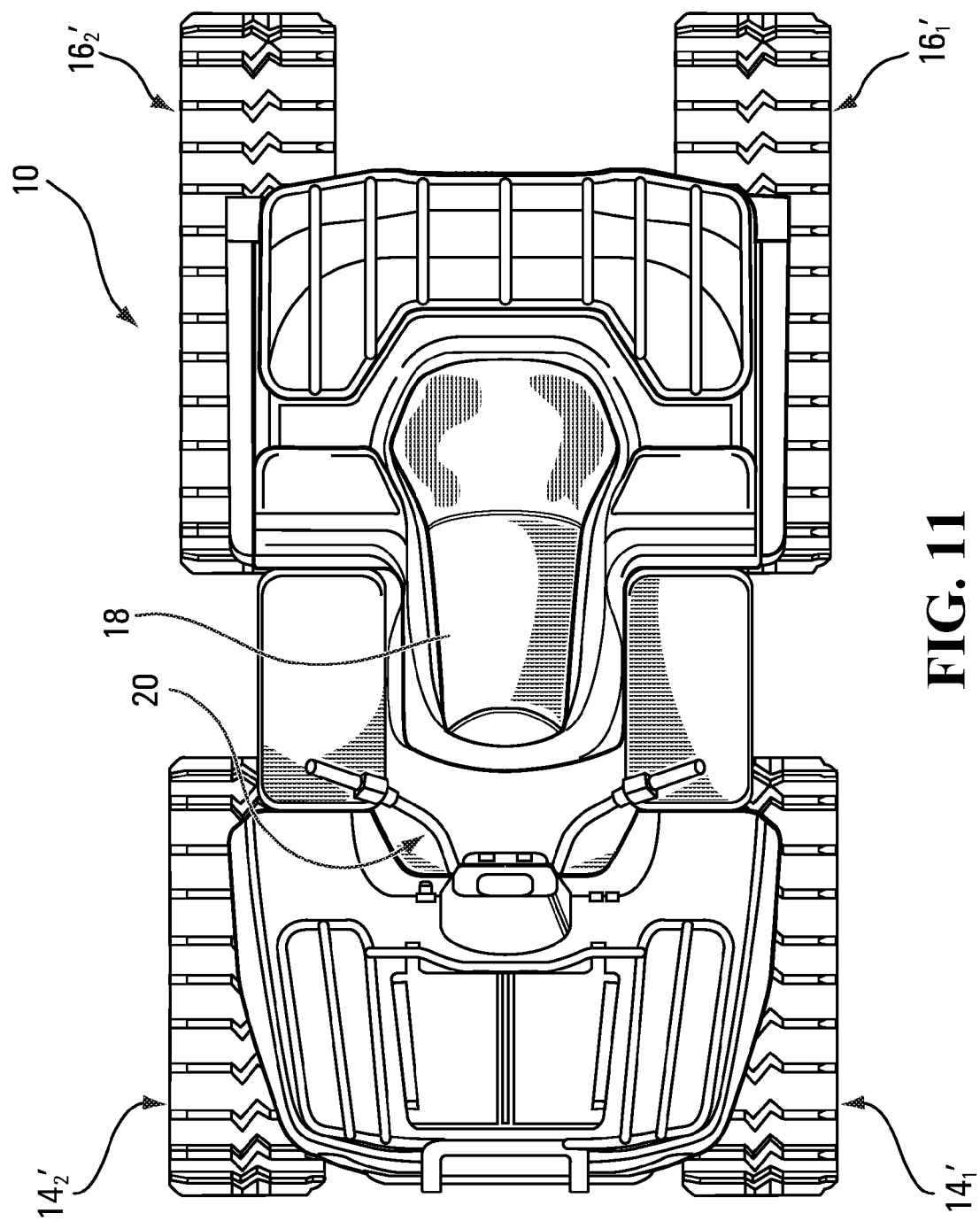
FIG. 11 shows a top view of the tracked vehicle of FIG. 10.
Figure 12:
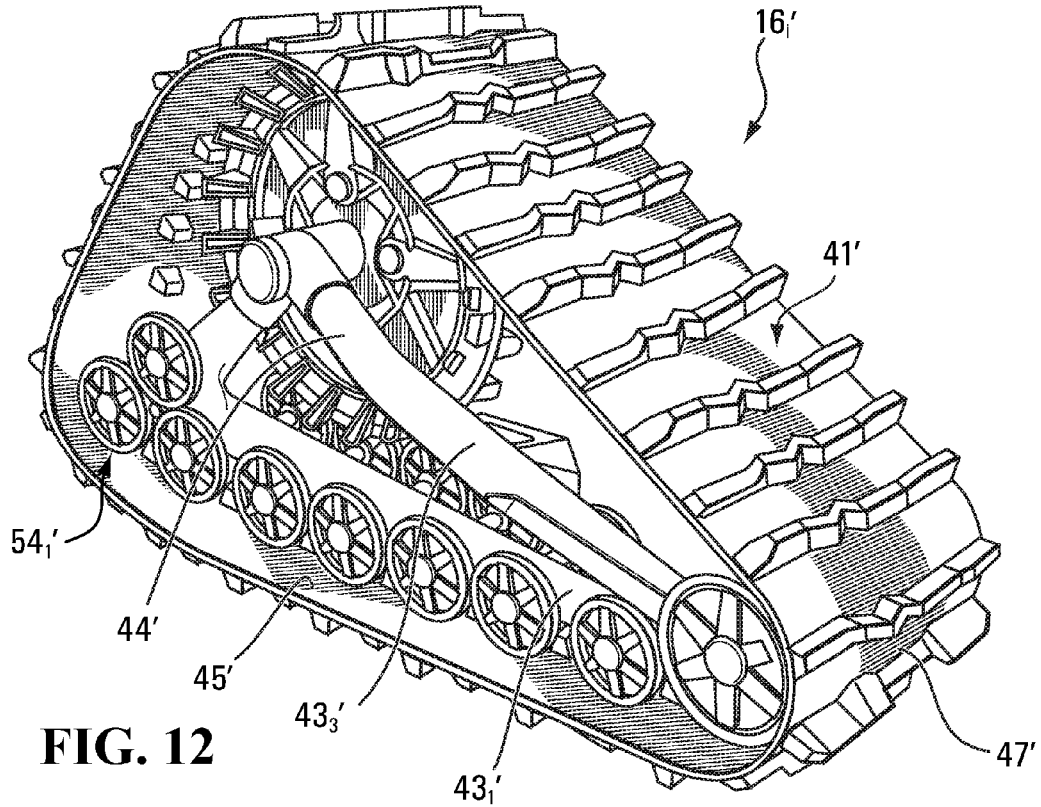
FIG. 12 shows a perspective view of a track assembly of the tracked vehicle of FIG. 10.

Turning now to FIGS. 10 and 11, there is shown another embodiment in which the ATV 10 comprises track assemblies $14'_1$, $14'_2$, $16'_1$, $16'_2$, instead of the track assemblies $14_1$, $14_2$, $16_1$, $16_2$ discussed previously.

The track assemblies $14'_1$, $14'_2$ are located in a front part of the ATV 10 to provide traction in this front part. Each track assembly $14'_i$ comprises a track 21', a drive wheel 22', a frame 24', a pair of front idler wheels $26_1$, $26_2$ (which are laterally spaced apart, with only the idler wheel $26_1$ being visible in FIG. 10), a pair of rear idler wheels $28_1$, $28_2$ (which are laterally spaced apart, with only the idler wheel $28_1$ being visible in FIG. 10), and a plurality of support wheels $30'_1$-$30'_8$ located longitudinally between these front and rear idler wheels.

The track 21', the drive wheel 22', the frame 24' and the support wheels $30'_1$-$30'_8$ of the track assembly $14'_i$ are respectively similar in construction and function to the track 21, the drive wheel 22, the frame 24, and the support wheels $30_1$-$30_6$ of the track assembly $14_i$ discussed previously.

The front idler wheels $26_1$, $26_2$ are rotatably mounted to the frame 24' in a front longitudinal end region 37' of the track assembly $14'_1$, while the rear idler wheels $28_1$, $28_2$ are rotatably mounted to the $24'$ in a rear longitudinal end region $39'$ of the track assembly $14'_i$. However, in contrast to the resilient wheels of the wheel devices $53_1$-$53_4$ of the track assembly $14_i$, the front idler wheels $26_1$, $26_2$ and the rear idler wheels $28_1$, $28_2$ are rigid wheels which do not elastically deform under load of the ATV 10 to induce a change in curvature of the track 21.

The track assemblies $16'_1$, $16'_2$ are located in a rear part of the ATV 10 to provide traction in this rear part. Each track assembly $16'_i$ comprises a track 41', a drive wheel 42', a frame 44', a pair of rear idler wheels $48_1$, $48_2$, a plurality of support wheels $50'_1$-$50'_{10}$, and a pair of wheel devices $54'_1$, $54'_2$.

The track 41', the drive wheel 42', the frame 44' and the support wheels $50'_1$-$50'_8$ of the track assembly $16'_i$ are respectively similar in construction and function to the track 41, the drive wheel 42, the frame 44, and the support wheels $50_1$-$50_8$ of the track assembly $16_i$ discussed previously.

The rear idler wheels $48_1$, $48_2$ roll on the inner side 45' of the track 41' such that the longitudinal end segment 32' of the track 41' turns around these wheels. Like the rear idler wheels $28_1$, $28_2$ of the track assembly $14'_1$, the rear idler wheels $48_1$, $48_2$ are rigid wheels which do not elastically deform under load of the ATV 10 to induce a change in curvature of the track 41'.

Each of the wheel devices $54'_1$, $54'_2$ is a device comprising at least one wheel. In this embodiment, the wheel device $54'_1$ comprises a wheel carrier 60 and three carried wheels $62_1$-$62_3$ rotatably mounted to the wheel carrier 60, and the wheel device $54'_2$ comprises a wheel carrier 64 and three carried wheels $66_1$-$66_3$ rotatably mounted to the wheel carrier 64.

The wheel devices $54'_1$, $54'_2$ are rotatable about respective axes of rotation 61, 67. In this embodiment, the axes of rotation 61, 67 are aligned with one another to constitute a common axis of rotation 87. More specifically, in this example, the wheel devices $54'_1$, $54'_2$ are rotatably mounted to the frame 44' via an axle 34 which provides the axis of rotation 87. In other examples, the wheel devices $54'_1$, $54'_2$ may be mounted to the frame 44' via respective axles which are aligned with one another and which provide the axes of rotation 61, 67. In other embodiments, the axis of rotation 61 and the axis of rotation 67 may be offset from one another.

Each of the wheel devices $54'_1$, $54'_2$ contacts the inner side 45 of the endless track 41' such that a longitudinal end segment 50' of the endless track 41' turns around that wheel device. That is, each of the wheel devices $54'_1$, $54'_2$ contacts both the top run of the endless track 41' and the bottom run of the endless track 41' such that the longitudinal end segment 50' of the endless track 41' includes a longitudinal end part of the top run of the endless track 41' and a longitudinal end part of the bottom run of the endless track 41'. In this embodiment, the longitudinal end segment 50' of the endless track 41' is located between the axis of rotation 87 of the wheel devices $54'_1$, $54'_2$ and the longitudinal end 57' of the track assembly $16'_i$. In embodiments in which the axis of rotation 61 and the axis of rotation 67 are offset from one another, the longitudinal end segment 50' of the endless track 41' is located between the longitudinal end 57' of the track assembly $16'_i$ and a given one of the axes of rotation 61, 67 which is closest to the longitudinal end 57' of the track assembly $16'_i$. Thus, in this example, the longitudinal end segment 50' of the endless track 41' is that segment of the track 41' between points $A_1'$ and $B_1'$.

Each of the wheel devices $54'_1$, $54'_2$ allows a change in curvature of the longitudinal end segment 50' of the endless track 41' when the longitudinal end segment 50' of the endless track 41' contacts an obstacle on the ground. This may absorb a shock resulting from contact with the obstacle and/or may make it easier for the track assembly $16'_i$ to surmount the obstacle.

With respect to the wheel device $54'_1$, the wheel carrier 60 is rotatably mounted to the frame 44' and adapted to turn about the axis 61. The carried wheels $62_1$-$62_3$ are mounted to the wheel carrier 60 and able to rotate about respective axes of rotation. In this embodiment, the carried wheels $62_1$-$62_3$ are disposed around the axis 61 (i.e., a closed imaginary line connecting their respective axes of rotation surrounds the axis 61).

More particularly, in this embodiment, the wheel carrier 60 comprises three arms $65_1$-$65_3$ that extend radially outward from the axis 61. In this case, the arms $65_1$-$65_3$ have the same length and are spaced at equal angles from one another. In other embodiments, the wheel carrier 60 may be configured in various other ways. For example, in some embodiments, instead of being a unitary structural element, the wheel carrier 60 may comprise two or more separate structural elements each carrying one or more of the carried wheels $62_1$-$62_3$ (e.g., three links each individually mounted to a common axle forming the axis 61 and each carrying one of the carried wheels $62_1$-$62_3$).

Each of the carried wheels $62_1$-$62_3$ is mounted to an axle on the wheel carrier 60 that defines the axis of rotation of that carried wheel. Specifically, in this embodiment, the carried wheel $62_1$ is rotatably mounted to the arm $65_1$, the carried wheel $62_2$ is rotatably mounted to the arm $65_2$, and the carried wheel $62_3$ is rotatably mounted to the arm $65_3$. The carried wheels $62_1$-$62_3$ are thus arranged in a triangular configuration, their respective axes of rotation defining a triangle in which is located the axis 61 about which the wheel carrier 60 can turn.

Each of the carried wheels $62_1$-$62_3$ may rotate about its respective axis of rotation independently of the wheel carrier 60. When the wheel carrier 60 turns about the axis 61, the carried wheels $62_1$-$62_3$ (which are mounted to the member 60) turn about the axis 61 and may also rotate about their respective axes of rotation.

Figure 13:
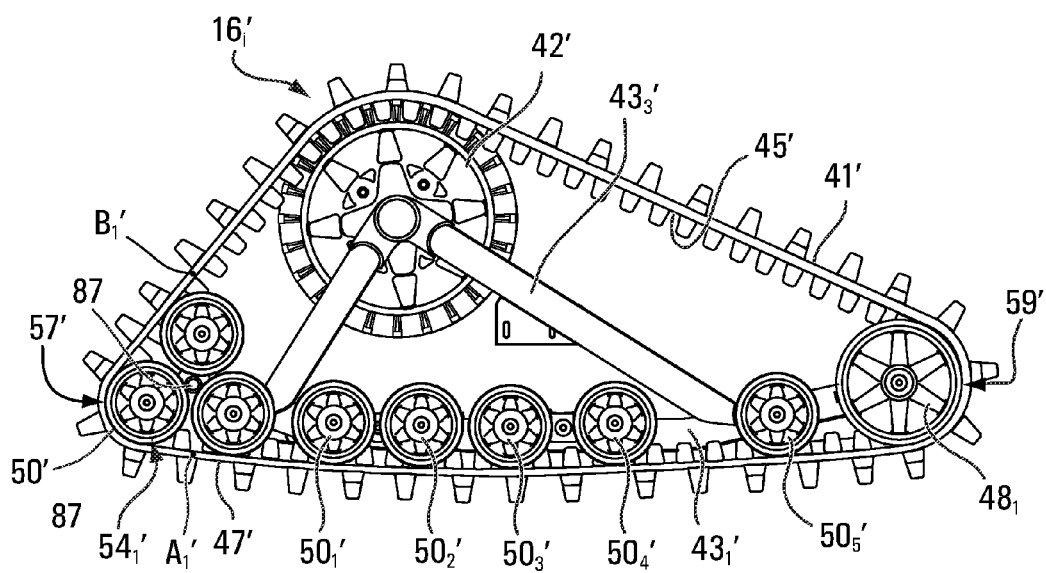
FIG. 13 shows a side view of the track assembly of FIG. 12.
Figure 14:
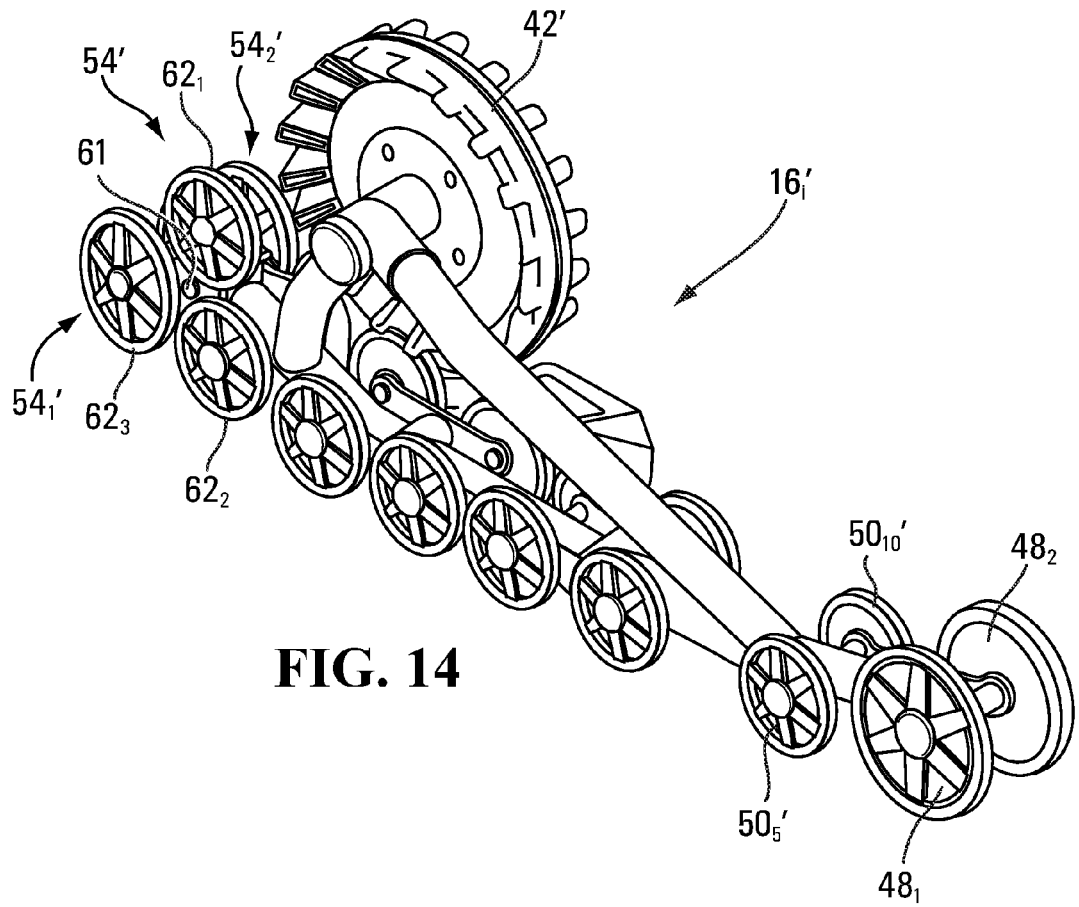
FIG. 14 shows a perspective view of the track assembly of FIG. 12 with a track removed.
Figure 15:
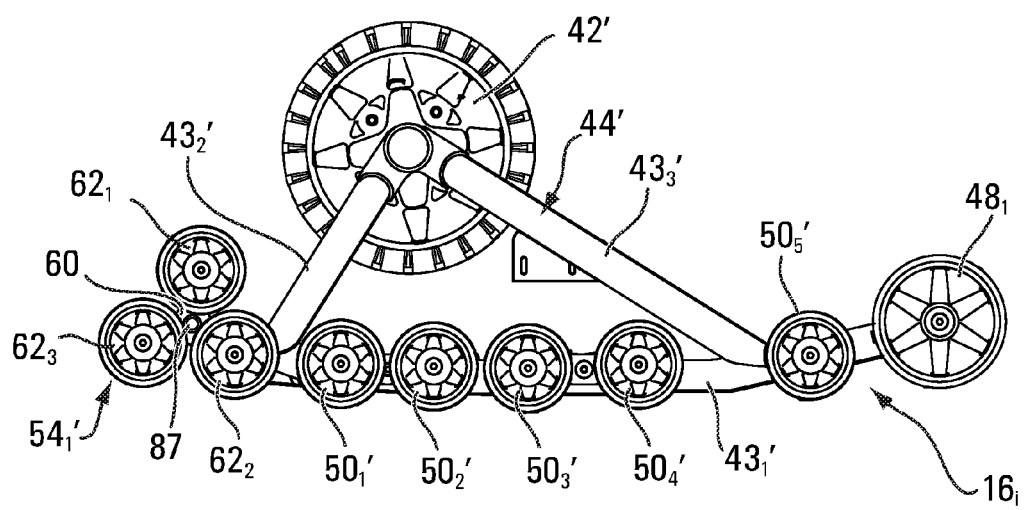
FIG. 15 shows a side view of the track assembly of FIG. 14.
Figure 16:
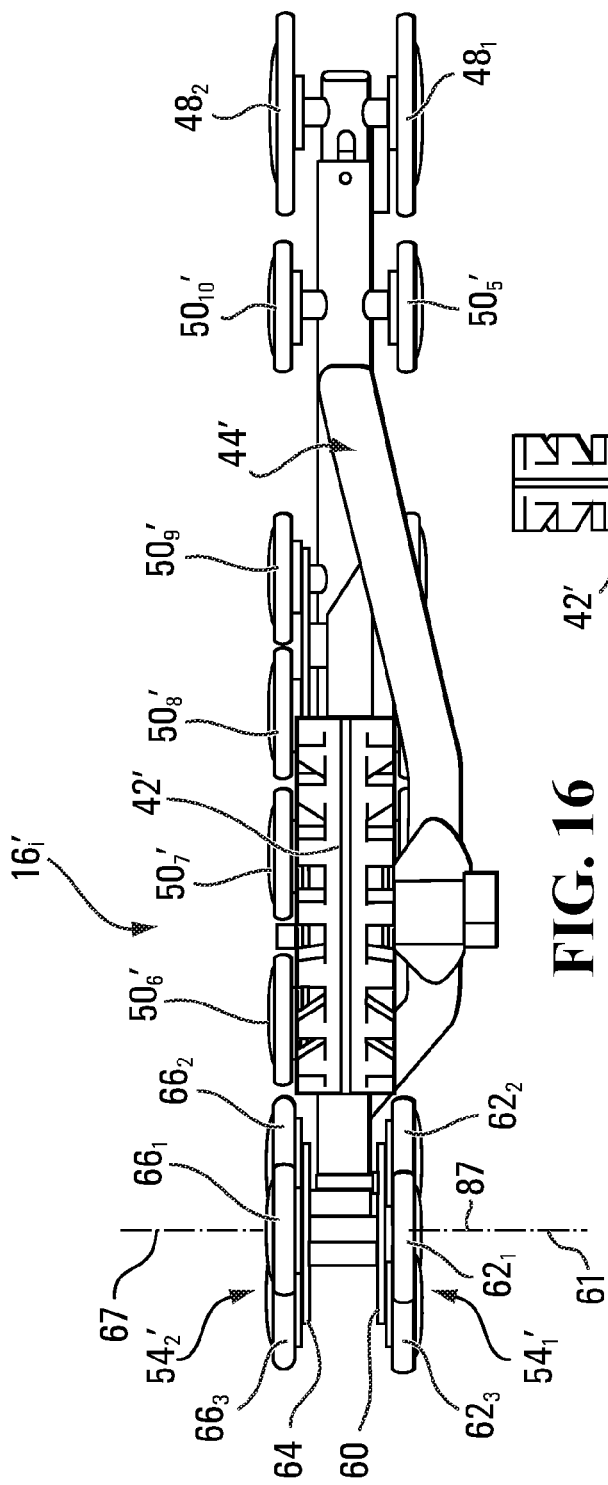
FIG. 16 shows a top view of the track assembly of FIG. 14.
Figure 17:
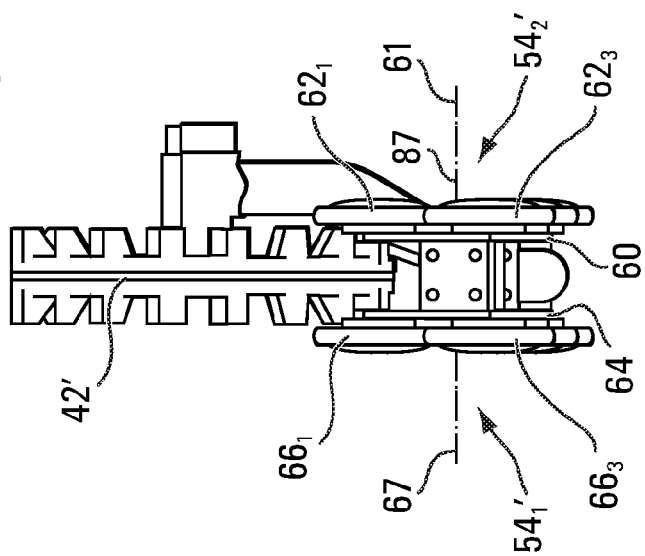
FIG. 17 shows an end view of the track assembly of FIG. 14.

More specifically, in this embodiment, when the ATV 10 is in motion along a ground surface that is free of obstacles, the carried wheels $62_1$-$62_3$ roll on the inner side 45' of the track 41' by rotating about their respective axes of rotation. During this time, the wheel carrier 60 and the carried wheels $62_1$-$62_3$ may be positioned such as shown in FIG. 13, where the carried wheels $62_2$ and $62_3$ are generally aligned with the support wheels $50'_1$-$50'_5$, while the carried wheel $62_1$ lies above the support wheels $50'_1$-$50'_5$. Also, in this position, the carried wheels $62_2$ and $62_3$ are positioned such that their respective axes of rotation lie slightly below the axis 61 while the carried wheel $62_1$ is positioned such that its axis of rotation lies above the axis 61. As a result, the wheel carrier 60 and the carried wheels $62_1$-$62_3$ impart a given curvature to the longitudinal end segment 50' of the endless track 41'. This given curvature is such that the longitudinal end segment 50' of the endless track 41' has a certain convexity, which in this case is useful for travelling along a level ground surface as it maximizes the contact area between the track 41' and the level ground surface.

When the longitudinal end segment 50' of the endless track 41' comes into contact with an obstacle on the ground, the wheel carrier 60 turns about the axis 61 to allow the track assembly $16'_i$ to overcome the obstacle. Specifically, because the carried wheels $62_1$-$62_3$ are rotatably mounted to the wheel carrier 60, they also turn about the axis 61 when the wheel carrier 60 turns. As the carried wheels $62_1$-$62_3$ roll on the inner side 45' of the track 41', this turning motion of the wheel carrier 60 and the carried wheels $62_1$-$62_3$ about the axis 61 induces a change in curvature of the longitudinal end segment 50' of the endless track 41'. This motion of the wheel carrier 60 and the carried wheels $62_1$-$62_3$ can absorb at least part of a shock resulting from contact with the obstacle. Also, the change in curvature of the longitudinal end segment 50' of the endless track 41' allows that segment of the track 41' to generally conform to the obstacle being encountered and can facilitate its surmounting.

While it can rotate about the axis of rotation 61, the wheel device $54'_1$ may be configured such that, in use, it does not necessarily make a complete rotation (i.e., a 360° rotation) about the axis 61. This is in contrast to the wheel devices $54_1$-$54_4$, $53_1$-$53_4$ discussed previously which, in use, make complete rotations about their respective axes of rotation.

The wheel device $54'_2$ is spaced apart from the wheel device $54'_1$ along the widthwise direction of the track assembly $16_i$. The wheel carrier 64 is rotatably mounted to the frame 44' and adapted to turn about the axis 67. The carried wheels $66_1$-$66_3$ are mounted to the wheel carrier 64 and able to rotate about respective axes of rotation. In this embodiment, the carried wheels $66_1$-$66_3$ are disposed around the axis 67 (i.e., an imaginary closed line connecting their respective axes of rotation surrounds the axis 67).

More particularly, in this embodiment, analogously to the wheel carrier 60 and the carried wheels $62_1$-$62_3$, the wheel carrier 64 comprises three arms $69_1$-$69_3$ that extend radially outward from the axis 67, with the carried wheels $66_1$-$66_3$ being rotatably mounted to respective ones of the arm $69_1$-$69_3$. Thus, each of the carried wheels $66_1$-$66_3$ may rotate about its respective axis of rotation independently of the wheel carrier 64, and, when the wheel carrier 64 turns about the axis 67, the carried wheels $66_1$-$66_3$ turn about the axis 67 and may also rotate about their respective axes of rotation.

With reference now to FIGS. 20 and 21, there will be described examples illustrating how the wheel devices $54'_1$, $54'_2$ of the track assembly $16'_i$ operate when the ATV 10 encounters obstacles on the ground.

As will be discussed, in this embodiment, the general slope of an encountered obstacle affects how the wheel devices $54'_1$, $54'_2$ of the track assembly $16'_i$ may react to the obstacle. In particular, when the general slope of the obstacle is not at a relatively steep angle, the wheel devices $54'_1$, $54'_2$ may react in a first manner by turning about their axes 61, 67 in a clockwise direction. For example, if the wheel devices $54'_1$, $54'_2$ encounter a relatively small bump on the ground, they may react in this first manner. In contrast, when the general slope of the obstacle is relatively steep, wheel devices $54'_1$, $54'_2$ may react in a second, different manner by turning about their axes 61, 67 in a counterclockwise direction. For example, if the ATV 10 is required to overcome a relatively large, irregularly shaped rock, the wheel devices $54'_1$, $54'_2$ may react in this second manner.

FIG. 20 shows an example of the result of an encounter between the wheel devices $54'_1$, $54'_2$ of the track assembly $16'_i$ and an obstacle 71 having a relatively small size. In this example, it is assumed that the obstacle 71 lying in the path of the ATV 10 is a portion of the trunk of a relatively small tree having fallen on the ground. It is further assumed that the ATV 10 was in motion along level ground and that the track assemblies $14'_1$, $14'_2$ in the front part of the ATV 10 have already cleared the trunk portion 71 which is now lying directly ahead of the track assemblies $16'_1$, $16'_2$ in the rear part of the ATV 10.

Up until the track assembly $16'_i$ contacts the trunk portion 71, the various components of the wheel devices $54'_1$, $54'_2$ are positioned as illustrated in FIGS. 10 and 13, namely as they are when the ATV 10 is travelling along a level ground surface. More specifically, the wheel carriers 60, 64 are in an angular position where: each of the carried wheels $62_1$, $66_1$ lies above the axis 61, 67; each of the carried wheels $62_2$, $66_2$, $62_3$, $66_3$ is in a vertical position that is generally below the carried wheels $62_1$, $66_1$; and the carried wheels $62_3$, $66_3$ are located longitudinally in front of the carried wheels $62_2$, $66_2$.

When the longitudinal end segment 50' of the endless track 41' contacts the trunk portion 71 at a contact point, the wheel devices $54'_1$, $54'_2$ react to this contact. In this example, the general slope of the trunk portion 71 may be seen as being relatively shallow. The general slope of the trunk portion 71 determines where the contact point between the trunk portion 71 and the track 41' may occur, which determines the manner in which the wheel devices $54'_1$, $54'_2$ react to the trunk portion 71. In this case, the gentle angle of the general slope causes the track 41' to contact the trunk portion 71 at a location on the track 41' that is generally longitudinally aligned with a lower portion of each of the carried wheels $62_3$, $66_3$ (i.e., a portion below its respective axis of rotation). As a result, the carried wheels $62_3$, $66_3$ are forced upwards and, as they are mounted to the wheel carriers 60, 64, they cause the wheel carriers 60, 64 to turn about the axis 61, 67 in a clockwise direction.

This turning motion of the wheel carriers 60, 64 in a clockwise direction adjusts the angular position of each of the carried wheels $62_1$, $66_1$, $62_2$, $66_2$. Specifically, in this case, this turning motion causes each of the carried wheels $62_1$, $66_1$ to follow an arc to a new angular position that may be vertically lower than and rearward of its original position, while it causes each of the carried wheels $62_2$, $66_2$ to move slightly lower and forwardly of its original position.

The wheel carriers 60, 64 and the carried wheels $62_1$-$62_3$, $66_1$-$66_3$ turning about the axis 61, 67 induces a change in curvature of the longitudinal end segment 50' of the endless track 41'. In particular, the change in curvature of the longitudinal end segment 50' of the endless track 41' allows that segment of the track 41' to generally conform to the general slope of the trunk portion 71 and can facilitate its surmounting. Indeed, in this example, the change in curvature is such that the portion of the track 41' between the carried wheels $62_3$, $66_3$ and the carried wheels $62_2$, $66_2$ is oriented generally upwardly and forwardly at an angle corresponding generally to the general slope of the trunk portion 71.

In this example, upon reaching the top part of the trunk portion 71, the wheel devices $54'_1$, $54'_2$ proceed to go down the trunk portion 71 and return to the first ground level. In this case, the wheel devices $54'_1$, $54'_2$ operate in a manner reverse to that previously described. In particular, as the carried wheels $62_3$, $66_3$ follow a general downward slope of the trunk portion 71 to return to the first ground level, they are forced downwards and thus cause the wheel carriers 60, 64 to turn about the axis 61, 67 in a counterclockwise direction. This turning motion of the wheel carriers 60, 64 in a counterclockwise direction adjusts the angular position of each of the carried wheels $62_1$, $66_1$, $62_2$, $66_2$.

Once the wheel devices $54'_1$, $54'_2$ have cleared the trunk portion 71, the wheel carriers 60, 64 and the carried wheels $62_1$-$62_3$, $66_1$-$66_3$ return to their original positions as shown in FIGS. 10 and 13.

FIG. 21 shows an example of the result of an encounter between the wheel devices $54'_1$, $54'_2$ of the track assembly $16'_i$ and an obstacle 73 having a relatively large size. In this example, it is assumed that the obstacle 73 lying in the path of the ATV 10 is a rock having a relatively large size. It is further assumed that the ATV 10 was in motion along level ground and that the track assemblies $14'_1$, $14'_2$ in the front part of the ATV 10 have already cleared the rock 73 which is now lying directly ahead of the track assemblies $16'_1$, $16'_2$ in the rear part of the ATV 10.

Up until the track assembly $16'_i$ contacts the rock 73, the various components of the wheel devices $54'_1$, $54'_2$ are positioned as illustrated in FIGS. 10 and 13, namely as they are when the ATV 10 is travelling along a level ground surface. More specifically, the wheel carriers 60, 64 are in an angular position where: each of the carried wheels $62_1$, $66_1$ lies above the axis 61, 67; each of the carried wheels $62_2$, $66_2$, $62_3$, $66_3$ is in a vertical position that is generally below the carried wheels $62_1$, $66_1$; and the carried wheels $62_3$, $66_3$ are located longitudinally in front of the carried wheels $62_2$, $66_2$.

When the longitudinal end segment 50' of the endless track 41' contacts the rock 73 at a contact point, the wheel devices $54'_1$, $54'_2$ react to this contact. In this example, the general slope of the rock 73 has a relatively steep angle. The general slope of the rock 73 determines where the contact point between the rock 73 and the track 41' may occur, which determines the manner in which the wheel devices $54'_1$, $54'_2$ react to the rock 73. In this case, the steep angle of the general slope causes the track 41' to contact the rock 73 at a location on the track 41' that is generally longitudinally aligned with a mid-portion of each of the carried wheels $62_3$, $66_3$ (i.e., a portion vertically aligned with its respective axis of rotation). The position of this contact point causes the carried wheels $62_3$, $66_3$ to momentarily stop moving. Because of the forward momentum of the track assembly $16'_i$, the carried wheels $62_3$, $66_3$ act as a temporary pivot and, as they are mounted to the wheel carriers 60, 64, they cause the wheel carriers 60, 64 to turn about the axis 61, 67 in a counterclockwise direction.

This turning motion of the wheel carriers 60, 64 in a counterclockwise direction adjusts the angular position of each of the carried wheels $62_1$, $66_1$, $62_2$, $66_2$. Specifically, in this case, this turning motion causes each of the carried wheels $62_1$, $66_1$ to follow an arc to a new angular position where it also engages the rock 73 via the track 41, while it causes each of the carried wheels $62_2$, $66_2$ to move upwardly.

The wheel carriers 60, 64 and the carried wheels $62_1$-$62_3$, $66_1$-$66_3$ turning about the axis 61, 67 induces a change in curvature of the longitudinal end segment 50' of the endless track 41'. In particular, the change in curvature of the longitudinal end segment 50' of the endless track 41' allows that segment of the track 41' to generally conform to the general slope of the rock 73 and can facilitate its surmounting. Indeed, in this example, the change in curvature is such that the portion of the track 41' between the carried wheels $62_3$, $66_3$ and the carried wheels $62_1$, $66_1$ is oriented generally upwardly at an angle corresponding generally to the general slope of the rock 73. In this case, this results in the carried wheels $62_1$, $66_1$ and $62_3$, $66_3$ becoming vertically in-line with each other, since the rock 73 presents a near-vertical face to the track assembly $16'_i$.

In this example, upon reaching a top part of the rock 73, a second counterclockwise rotation of the wheel carriers 60, 64 is initiated. More particularly, up to the point where wheel devices $54'_1$, $54'_2$ reach the top part of the rock 73, the carried wheels $62_1$, $66_1$ and the carried wheels $62_3$, $66_3$ remain generally vertically in-line with each other. In this configuration, the carried wheels $62_1$, $66_1$ first reach the top part of the rock 73, which is considerably less steep than the general slope of the rock 73 initially encountered. This change in slope results in the contact point between each of the carried wheels $62_1$, $66_1$ and the top part of the rock 73 shifting back towards the lower part of that wheel. Thus, with the forward momentum of the track assembly $16'_i$, when the carried wheels $62_1$, $66_1$ reach the top part of the rock 73, they cause the wheel carriers 60, 64 to turn about the axis 61, 67 a second time in a counterclockwise direction.

As it goes down the rock 73, the wheel devices $54'_1$, $54'_2$ operate in a manner reverse to that previously described. In particular, the carried wheels $62_1$, $66_1$ and the carried wheels $62_3$, $66_3$ follow a general downward slope of the rock 73 to return to the first ground level.

While in this embodiment the wheel devices $54'_1$, $54'_2$ of each of the track assemblies $16'_1$, $16'_2$ are configured in a particular way, they may be configured in various other ways in other embodiments.

For example, in some embodiments, two or more than three carried wheels (similar to the carried wheels $62_1$-$62_3$, $66_1$-$66_3$) may be rotatably mounted to each of the wheel carriers 60, 64 of the track assembly $16'_i$. For instance, in some embodiments, four carried wheels may be rotatably mounted to any one of the wheel carriers 60, 64. These four carried wheels may be arranged in a rectangular configuration, i.e., their respective axes of rotation may define a rectangle (e.g., a square) in which is located the axis 61, 67 of the wheel carrier 60, 64 to which they are rotatably mounted.

As another example, instead of being all mounted on one lateral side of each of the wheel carriers 60, 64, in some embodiments, carried wheels such as the carried wheels $62_1$-$62_3$, $66_1$-$66_3$ may be mounted on both lateral sides of any one of the wheel carriers 60, 64. For instance, in some embodiments, two of the carried wheels $66_1$-$66_3$ may be mounted on the inner lateral side of the wheel carrier 64 that lies proximate to a main body of the ATV 10, while the remaining one of the carried wheels $66_1$-$66_3$ may be mounted on the opposite, outer lateral side of the wheel carrier 64.

As yet another example, in some embodiments, the track assembly $16_i$ may comprise more or less than two wheel devices such as the wheel devices $54'_1$, $54'_2$. For instance, in some embodiments, the track assembly $16_i$ may comprise three or four wheel devices such as the wheel devices $54'_1$, $54'_2$ that are laterally spaced from one another and each carry three or more carried wheels such as the carried wheels $62_1$-$62_3$, $66_1$-$66_3$.

As yet another example, instead of being positioned in the front longitudinal end region 37' of the track assembly $16'_i$ in front of the support wheels $50'_1$-$50'_{10}$, in some embodiments, the wheel devices $54'_1$, $54'_2$ may be positioned in the rear longitudinal end region 39' of the track assembly $16'_i$ behind the support wheels $50'_1$-$50'_{10}$ to replace the rear idler wheels $48_1$, $48_2$. Alternatively, in other embodiments, the track assembly $16'_i$ may comprise wheel devices such as the wheel devices $54'_1$, $54'_2$ both in the front longitudinal end region 37' of the track assembly $16'_i$ and in the rear longitudinal end region 39' of the track assembly $16'_i$.

Although in this embodiment each of the track assemblies $16'_1$, $16'_2$ comprises the wheel devices $54'_1$, $54'_2$ but each of the track assemblies $14'_1$, $14'_2$ does not comprise such wheel devices, in other embodiments, each of the track assemblies $14'_1$, $14'_2$ may comprise wheel devices such as the wheel devices $54'_1$, $54'_2$ instead of its front idler wheels $26_1$, $26_2$ and/or its rear idler wheels $28_1$, $28_2$.

While in this embodiment the wheel devices $53_1$-$53_4$, $54_1$-$54_4$, $54'_1$, $54'_2$ are used as part of track assemblies of an ATV, in other embodiments, similar wheel devices constructed according to principles discussed herein may be used as part of track assemblies of other types of tracked vehicles. For example, in some embodiments, a wheel device constructed according to principles discussed herein may be used as part of a track assembly of a snowmobile. As another example, in some embodiments, a wheel device constructed according to principles discussed herein may be used as part of a track assembly of a work vehicle, such as a construction vehicle (e.g., a bulldozes, a backhoe loader, an excavator, etc.), an agricultural vehicle (e.g., a harvester, a combine, a tractor, etc.) a forestry vehicle (e.g., a feller-buncher, a tree chipper, a knuckleboom loader, etc.) or any other vehicle operable off-road.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track assembly for providing traction to a vehicle on a ground surface, the track assembly being mountable to an axle of the vehicle and comprising:
   a) an endless track comprising a ground-engaging outer side for engaging the ground surface and an inner side opposite to the ground-engaging outer side; and
   b) a track-engaging arrangement for driving and guiding the endless track, the endless track being disposed around the track-engaging arrangement, the track-engaging arrangement comprising:
      i. a drive wheel for driving the endless track when the axle of the vehicle rotates; and
      ii. a plurality of idler wheels which includes a leading idler wheel and a trailing idler wheel spaced apart in a longitudinal direction of the track assembly and contacting a bottom run of the endless track;
   wherein: each idler wheel of the plurality of idler wheels is resilient and comprises foam; the inner side of the endless track comprises a plurality of wheel-contacting projections for contacting at least one of the drive wheel and the plurality of idler wheels; and a width of the idler wheel in a widthwise direction of the track assembly is greater than a dimension of a given one of the wheel-contacting projections in the widthwise direction of the track assembly.

2. The track assembly claimed in claim 1, wherein the foam of the idler wheel forms at least part of a periphery of the idler wheel.

3. The track assembly claimed in claim 1, wherein the track-engaging arrangement comprises a plurality of support wheels disposed between the leading idler wheel and the trailing idler wheel in the longitudinal direction of the track assembly and contacting the bottom run of the endless track, an outer diameter of the idler wheel being greater than an outer diameter of a given one of the support wheels.

4. The track assembly claimed in claim 3, comprising a frame supporting the leading idler wheel and the trailing idler wheel, wherein the width of the idler wheel in the widthwise direction of the track assembly occupies at least a majority of a distance between a lateral surface of the idler wheel and a center of the frame in the widthwise direction of the track assembly.

5. The track assembly claimed in claim 3, wherein the idler wheel is wider than the given one of the support wheels in the widthwise direction of the track assembly.

6. The track assembly claimed in claim 1, wherein the idler wheel comprises a hub and a tire disposed around the hub and comprising the foam, the tire including a first lateral side, a second lateral side, and a circumferential surface extending from the first lateral side to the second lateral side, the tire having a single opening extending from the first lateral side to the second lateral side, the hub being located in the single opening of the tire.

7. The track assembly claimed in claim 1, wherein the foam of the idler wheel is closed-cell foam.

8. The track assembly claimed in claim 7, wherein the closed-cell foam is closed-cell polyurethane foam.

9. The track assembly claimed in claim 1, wherein a radial extent of the idler wheel corresponding to at least 20% of an outer radius of the idler wheel is elastically deformable.

10. The track assembly claimed in claim 1, comprising a frame supporting the leading idler wheel and the trailing idler wheel and mounted about an axis of rotation of the drive wheel.

11. The track assembly claimed in claim 1, comprising a frame supporting the leading idler wheel and the trailing idler wheel and having a pivot point located between the leading idler wheel and the trailing idler wheel in the longitudinal direction of the track assembly.

12. The track assembly claimed in claim 11, wherein the pivot point of the frame corresponds to an axis of rotation of the drive wheel.

13. The track assembly claimed in claim 1, comprising a frame supporting the leading idler wheel and the trailing idler wheel, an axis of rotation of the leading idler wheel and an axis of rotation of the trailing idler wheel being movable relative to an axis of rotation of the drive wheel when the track assembly traverses an uneven area of the ground surface.

14. The track assembly claimed in claim 1, wherein a distance between an axis of rotation of the drive wheel and an axis of rotation of the leading idler wheel in the longitudinal direction of the track assembly is different from a distance between the axis of rotation of the drive wheel and an axis of rotation of the trailing idler wheel in the longitudinal direction of the track assembly.

15. The track assembly claimed in claim 1, wherein the leading idler wheel is a first leading idler wheel and the trailing idler wheel is a first trailing idler wheel, and the plurality of idler wheels includes a second leading idler wheel spaced apart from the first leading idler wheel in the widthwise direction of the track assembly, and a second trailing idler wheel spaced apart from the first trailing idler wheel in the widthwise direction of the track assembly.

16. The track assembly claimed in claim 1, wherein the inner side of the plurality of wheel-contacting projections comprises a plurality of drive projections and the drive wheel comprises a sprocket for engaging the drive projections.

17. An all-terrain vehicle (ATV) comprising a set of four track assemblies, wherein each of at least two of the four track assemblies is as claimed in claim 1.

18. A track assembly for providing traction to a vehicle on a ground surface, the track assembly being mountable to an axle of the vehicle and comprising:
   a) an endless track comprising a ground-engaging outer side for engaging the ground surface and an inner side opposite to the ground-engaging outer side;
   b) a track-engaging arrangement for driving and guiding the endless track, the endless track being disposed around the track-engaging arrangement, the track-engaging arrangement comprising:
      i. a drive wheel for driving the endless track when the axle of the vehicle rotates; and
      ii. a plurality of idler wheels which includes a leading idler wheel and a trailing idler wheel spaced apart in a longitudinal direction of the track assembly and contacting a bottom run of the endless track;
   wherein: each idler wheel of the plurality of idler wheels is resilient and elastically deformable when the endless track contacts an obstacle on the ground surface; the inner side of the endless track comprises a plurality of wheel-contacting projections for contacting at least one of the drive wheel and the plurality of idler wheels; and a width of the idler wheel in a widthwise direction of the track assembly is greater than a dimension of a given one of the wheel-contacting projections in the widthwise direction of the track assembly.

19. The track assembly claimed in claim 18, wherein the idler wheel comprises foam.

20. The track assembly claimed in claim 19, wherein the foam of the idler wheel forms at least part of a periphery of the idler wheel.

21. The track assembly claimed in claim 19, wherein the foam of the idler wheel is closed-cell foam.

22. The track assembly claimed in claim 21, wherein the closed-cell foam is closed-cell polyurethane foam.

23. The track assembly claimed in claim 18, wherein the track-engaging arrangement comprises a plurality of support wheels disposed between the leading idler wheel and the trailing idler wheel in the longitudinal direction of the track assembly and contacting the bottom run of the endless track, an outer diameter of the idler wheel being greater than an outer diameter of a given one of the support wheels.

24. The track assembly claimed in claim 23, comprising a frame supporting the leading idler wheel and the trailing idler wheel, wherein the width of the idler wheel in the widthwise direction of the track assembly occupies at least a majority of a distance between a lateral surface of the idler wheel and a center of the frame in the widthwise direction of the track assembly.

25. The track assembly claimed in claim 23, wherein the idler wheel is wider than the given one of the support wheels in the widthwise direction of the track assembly.

26. The track assembly claimed in claim 18, wherein the idler wheel comprises a hub and a tire disposed around the hub and comprising the foam, the tire including a first lateral side, a second lateral side, and a circumferential surface extending from the first lateral side to the second lateral side, the tire having a single opening extending from the first lateral side to the second lateral side, the hub being located in the single opening of the tire.

27. The track assembly claimed in claim 18, wherein a radial extent of the idler wheel corresponding to at least 20% of an outer radius of the idler wheel is elastically deformable.

28. The track assembly claimed in claim 18, comprising a frame supporting the leading idler wheel and the trailing idler wheel and mounted about an axis of rotation of the drive wheel.

29. The track assembly claimed in claim 18, comprising a frame supporting the leading idler wheel and the trailing idler wheel and having a pivot point located between the leading idler wheel and the trailing idler wheel in the longitudinal direction of the track assembly.

30. The track assembly claimed in claim 29, wherein the pivot point of the frame corresponds to an axis of rotation of the drive wheel.

31. The track assembly claimed in claim 18, comprising a frame supporting the leading idler wheel and the trailing idler wheel, an axis of rotation of the leading idler wheel and an axis of rotation of the trailing idler wheel being movable relative to an axis of rotation of the drive wheel when the track assembly traverses an uneven area of the ground surface.

32. The track assembly claimed in claim 18, wherein a distance between an axis of rotation of the drive wheel and an axis of rotation of the leading idler wheel in the longitudinal direction of the track assembly is different from a distance between the axis of rotation of the drive wheel and an axis of rotation of the trailing idler wheel in the longitudinal direction of the track assembly.

33. The track assembly claimed in claim 18, wherein the leading idler wheel is a first leading idler wheel and the trailing idler wheel is a first trailing idler wheel, and the plurality of idler wheels includes a second leading idler wheel spaced apart from the first leading idler wheel in the widthwise direction of the track assembly and a second trailing idler wheel spaced apart from the first trailing idler wheel in the widthwise direction of the track assembly.

34. The track assembly claimed in claim 18, wherein the plurality of wheel-contacting projections comprises a plurality of drive projections and the drive wheel comprises a sprocket for engaging the drive projections.

35. An all-terrain vehicle (ATV) comprising a set of four track assemblies, wherein each of at least two of the four track assemblies is as claimed in claim 18.

36. A track assembly for providing traction to a vehicle on a ground surface, the track assembly being mountable to an axle of the vehicle and comprising:
 a) an endless track comprising:
  i. a ground-engaging outer side for engaging the ground surface; and
  ii. an inner side opposite to the ground-engaging outer side and comprising a plurality of wheel-contacting projections;
 b) a track-engaging arrangement for driving and guiding the endless track, the endless track being disposed around the track-engaging arrangement, the track-engaging arrangement comprising:
  i. a drive wheel for driving the endless track when the axle of the vehicle rotates;
  ii. a plurality of idler wheels which includes a leading idler wheel and a trailing idler wheel spaced apart in a longitudinal direction of the track assembly and contacting a bottom run of the endless track; and
  iii. a plurality of support wheels disposed between the leading idler wheel and the trailing idler wheel in the longitudinal direction of the track assembly and contacting the bottom run of the endless track;
 wherein each idler wheel of the plurality of idler wheels is resilient and elastically deformable when the endless track contacts an obstacle on the ground surface, an outer diameter of the idler wheel is greater than an outer diameter of a given one of the support wheels, and a width of the idler wheel in a widthwise direction of the track assembly is greater than a dimension of a given one of the wheel-contacting projections in the widthwise direction of the track assembly.

37. The track assembly claimed in claim 36, wherein the wheel-contacting projections are drive projections for engaging the drive wheel.

38. The track assembly claimed in claim 36, wherein: the leading idler wheel is a first leading idler wheel and the trailing idler wheel is a first trailing idler wheel; the plurality of idler wheels includes a second leading idler wheel spaced apart from the first leading idler wheel in the widthwise direction of the track assembly and a second trailing idler wheel spaced apart from the first trailing idler wheel in the widthwise direction of the track assembly; the first leading idler wheel and the second leading idler wheel collectively occupying a majority of a span of the first leading idler wheel and the second leading idler wheel in the widthwise direction of the track assembly; and the first trailing idler wheel and the second trailing idler wheel collectively occupying a majority of a span of the first trailing idler wheel and the second trailing idler wheel in the widthwise direction of the track assembly.

39. The track assembly claimed in claim 36, wherein the idler wheel comprises foam.

40. The track assembly claimed in claim 39, wherein the foam of the idler wheel forms at least part of a periphery of the idler wheel.

41. The track assembly claimed in claim 39, wherein the foam of the idler wheel is closed-cell foam.

42. The track assembly claimed in claim 41, wherein the closed-cell foam is closed-cell polyurethane foam.

43. The track assembly claimed in claim 36, comprising a frame supporting the leading idler wheel and the trailing idler wheel, wherein the width of the idler wheel in the widthwise direction of the track assembly occupies at least a majority of a distance between a lateral surface of the idler wheel and a center of the frame in the widthwise direction of the track assembly.

44. The track assembly claimed in claim 36, wherein the idler wheel is wider than the given one of the support wheels in the widthwise direction of the track assembly.

45. The track assembly claimed in claim 36, wherein the idler wheel comprises a hub and a tire disposed around the hub and comprising the foam, the tire including a first lateral side, a second lateral side, and a circumferential surface extending from the first lateral side to the second lateral side, the tire having a single opening extending from the first lateral side to the second lateral side, the hub being located in the single opening of the tire.

46. The track assembly claimed in claim 36, wherein a radial extent of the idler wheel corresponding to at least 20% of an outer radius of the idler wheel is elastically deformable.

47. The track assembly claimed in claim 36, comprising a frame supporting the leading idler wheel and the trailing idler wheel and mounted about an axis of rotation of the drive wheel.

48. The track assembly claimed in claim 36, comprising a frame supporting the leading idler wheel and the trailing idler wheel and having a pivot point located between the leading idler wheel and the trailing idler wheel in the longitudinal direction of the track assembly.

49. The track assembly claimed in claim 48, wherein the pivot point of the frame corresponds to an axis of rotation of the drive wheel.

50. The track assembly claimed in claim 36, comprising a frame supporting the leading idler wheel and the trailing idler wheel, an axis of rotation of the leading idler wheel and an axis of rotation of the trailing idler wheel being movable relative to an axis of rotation of the drive wheel when the track assembly traverses an uneven area of the ground surface.

51. The track assembly claimed in claim 36, wherein a distance between an axis of rotation of the drive wheel and an axis of rotation of the leading idler wheel in the longitudinal direction of the track assembly is different from a distance between the axis of rotation of the drive wheel and an axis of rotation of the trailing idler wheel in the longitudinal direction of the track assembly.

52. An all-terrain vehicle (ATV) comprising a set of four track assemblies, wherein each of at least two of the four track assemblies is as claimed in claim 36.

53. A track assembly for providing traction to a vehicle on a ground surface, the track assembly being mountable to an axle of the vehicle and comprising:
 a) an endless track comprising a ground-engaging outer side for engaging the ground surface and an inner side opposite to the ground-engaging outer side; and
 b) a track-engaging arrangement for driving and guiding the endless track, the endless track being disposed around the track-engaging arrangement, the track-engaging arrangement comprising:
  i. a drive wheel for driving the endless track when the axle of the vehicle rotates; and
  ii. a plurality of idler wheels which includes:
   a first leading idler wheel and a second leading idler wheel that are spaced apart from one another in a widthwise direction of the track assembly; and
   first trailing idler wheel and a second trailing idler wheel that are spaced apart from one another in the widthwise direction of the track assembly, the first trailing idler wheel and the second trailing idler wheel being spaced apart from the first leading idler wheel and the second leading idler wheel in a longitudinal direction of the track assembly;
  wherein: each idler wheel of the plurality of idler wheels is resilient and elastically deformable when the endless track contacts an obstacle on the ground surface; the first leading idler wheel and the second leading idler wheel collectively occupy a majority of a span of the first leading idler wheel and the second leading idler wheel in the widthwise direction of the track assembly; and the first trailing idler wheel and the second trailing idler wheel collectively occupy a majority of a span of the first trailing idler wheel and the second trailing idler wheel in the widthwise direction of the track assembly.

54. The track assembly claimed in claim 53, wherein the idler wheel comprises foam.

55. The track assembly claimed in claim 54, wherein the foam of the idler wheel forms at least part of a periphery of the idler wheel.

56. The track assembly claimed in claim 54, wherein the foam of the idler wheel is closed-cell foam.

57. The track assembly claimed in claim 56, wherein the closed-cell foam is closed-cell polyurethane foam.

58. The track assembly claimed in claim 53, wherein the track-engaging arrangement comprises a plurality of support wheels disposed between (i) the first leading idler wheel and the second leading idler wheel and (ii) the first trailing idler wheel and the second trailing idler wheel in the longitudinal direction of the track assembly and contacting the bottom run of the endless track, an outer diameter of the idler wheel being greater than an outer diameter of a given one of the support wheels.

59. The track assembly claimed in claim 58, comprising a frame supporting the plurality of idler wheels, wherein a width of the idler wheel in the widthwise direction of the track assembly occupies at least a majority of a distance between a lateral surface of the idler wheel and a center of the frame in the widthwise direction of the track assembly.

60. The track assembly claimed in claim 58, wherein the idler wheel is wider than the given one of the support wheels in the widthwise direction of the track assembly.

61. The track assembly claimed in claim 53, wherein the idler wheel comprises a hub and a tire disposed around the hub and comprising the foam, the tire including a first lateral side, a second lateral side, and a circumferential surface extending from the first lateral side to the second lateral side, the tire having a single opening extending from the first lateral side to the second lateral side, the hub being located in the single opening of the tire.

62. The track assembly claimed in claim 53, wherein a radial extent of the idler wheel corresponding to at least 20% of an outer radius of the idler wheel is elastically deformable.

63. The track assembly claimed in claim 53, comprising a frame supporting the plurality of idler wheels and mounted about an axis of rotation of the drive wheel.

64. The track assembly claimed in claim 53, comprising a frame supporting the plurality of idler wheels and having a pivot point located between (i) the first leading idler wheel and the second leading idler wheel and (ii) the first trailing idler wheel and the second trailing idler wheel in the longitudinal direction of the track assembly.

65. The track assembly claimed in claim 64, wherein the pivot point of the frame corresponds to an axis of rotation of the drive wheel.

66. The track assembly claimed in claim 53, comprising a frame supporting the plurality of idler wheels, an axis of rotation of the first leading idler wheel and an axis of rotation of the first trailing idler wheel being movable relative to an axis of rotation of the drive wheel when the track assembly traverses an uneven area of the ground surface.

67. The track assembly claimed in claim 53, wherein a distance between an axis of rotation of the drive wheel and an axis of rotation of the first leading idler wheel in the longitudinal direction of the track assembly is different from a distance between the axis of rotation of the drive wheel and an axis of rotation of the first trailing idler wheel in the longitudinal direction of the track assembly.

68. The track assembly claimed in claim 53, wherein the inner side of the endless track comprises a plurality of drive projections and the drive wheel comprises a sprocket for engaging the drive projections.

69. An all-terrain vehicle (ATV) comprising a set of four track assemblies, wherein each of at least two of the four track assemblies is as claimed in claim 53.

\* \* \* \* \*

UNITED STATES PATENT AND TRADEMARK OFFICE
CERTIFICATE OF CORRECTION

PATENT NO. : 9,033,430 B2
APPLICATION NO. : 12/767895
DATED : May 19, 2015
INVENTOR(S) : Jeremie Zuchoski, Jean Bernard and Stéphane Pilette It is certified that error appears in the above-identified patent and that said Letters Patent is hereby corrected as shown below:

In the claims

Column 17 line 59 Claim 5, point b) / ii./ second paragraph, should start with an « a » in order to read « a first trailing … ».

Column 18 line 41-42 Claim 16, should read « … wherein the plurality of wheel-contacting … » instead of « … wherein the inner side of the plurality of wheel-contacting … ».

Signed and Sealed this
First Day of December, 2015

Michelle K. Lee
*Director of the United States Patent and Trademark Office*